United States Patent
Burgess

(10) Patent No.: US 8,978,356 B2
(45) Date of Patent: Mar. 17, 2015

(54) THRUST REVERSER AND VARIABLE AREA FAN NOZZLE ACTUATION SYSTEM AND METHOD

(75) Inventor: Michael John Burgess, Seattle, WA (US)

(73) Assignee: The Boeing Company, Chicago, IL (US)

(*) Notice: Subject to any disclaimer, the term of this patent is extended or adjusted under 35 U.S.C. 154(b) by 1139 days.

(21) Appl. No.: 12/960,442

(22) Filed: Dec. 3, 2010

(65) Prior Publication Data

US 2012/0137654 A1    Jun. 7, 2012

(51) Int. Cl.
| | |
|---|---|
| F02K 3/02 | (2006.01) |
| F02K 1/76 | (2006.01) |
| F02K 1/06 | (2006.01) |
| F02K 1/08 | (2006.01) |
| F02K 1/09 | (2006.01) |
| F02K 1/54 | (2006.01) |
| F02K 1/16 | (2006.01) |
| F15B 15/08 | (2006.01) |
| F15B 15/26 | (2006.01) |
| F02K 1/64 | (2006.01) |

(52) U.S. Cl.
CPC . *F02K 1/763* (2013.01); *F02K 1/06* (2013.01); *F02K 1/08* (2013.01); *F02K 1/09* (2013.01); *F02K 1/54* (2013.01); *F02K 1/76* (2013.01); *F02K 1/16* (2013.01); *F15B 15/088* (2013.01); *F15B 15/261* (2013.01); *Y02T 50/671* (2013.01); *F02K 1/64* (2013.01)
USPC .................................. 60/226.2; 60/226.3

(58) Field of Classification Search
CPC ............... F02K 1/06; F02K 1/54; F02K 1/56; F02K 1/64; F02K 1/76; F02K 1/763; F02K 1/766; F15B 15/088; F15B 15/08

USPC .......... 60/204, 226.1, 226.2, 226.3, 230, 262, 60/771; 239/265.19, 265.23, 265.25, 239/265.29, 265.31, 265.33, 265.37

See application file for complete search history.

(56) References Cited

U.S. PATENT DOCUMENTS

| | | |
|---|---|---|
| 5,611,489 A | 3/1997 | Berneuil et al. |
| 5,778,659 A | 7/1998 | Duesler et al. |
| 5,806,302 A | 9/1998 | Cariola et al. |

(Continued)

FOREIGN PATENT DOCUMENTS

| | | | | |
|---|---|---|---|---|
| EP | 1288478 A1 | 3/2003 | | |
| GB | 2446441 A | * | 8/2008 | ............. F15B 15/14 |

OTHER PUBLICATIONS

International Search Report and Written Opinion, for Counterpart PCT International Application No. PCT/US2011/058576, Applicant The Boeing Company, Date of Mailing Dec. 16, 2013, 10 pages.

*Primary Examiner* — Phutthiwat Wongwian
*Assistant Examiner* — Alain Chau

(57) ABSTRACT

There is provided an actuation system for a gas turbine engine including a thrust reverser and a variable area fan nozzle. The system has a plurality of linear actuators each having a first outer piston concentric with a second inner piston. The first outer piston is operatively connected to a thrust reverser. The second inner piston is operatively connected to a variable area fan nozzle. The system further has a piston lock assembly for selectively locking the first outer piston to the second inner piston. The system further has a control system coupled to the plurality of linear actuators for operating the variable area fan nozzle between a stowed position and a deployed position.

21 Claims, 21 Drawing Sheets

(56) References Cited

U.S. PATENT DOCUMENTS

| | | | |
|---|---|---|---|
| 5,809,833 A * | 9/1998 | Newport et al. | 74/89.37 |
| 6,622,474 B1 * | 9/2003 | Sternberger et al. | 60/226.2 |
| 6,969,028 B2 | 11/2005 | Dun | |
| 7,124,981 B2 | 10/2006 | Parham | |
| 2005/0155658 A1 * | 7/2005 | White | 138/31 |
| 2010/0115958 A1 | 5/2010 | Parham | |
| 2010/0126139 A1 | 5/2010 | Howe | |

* cited by examiner

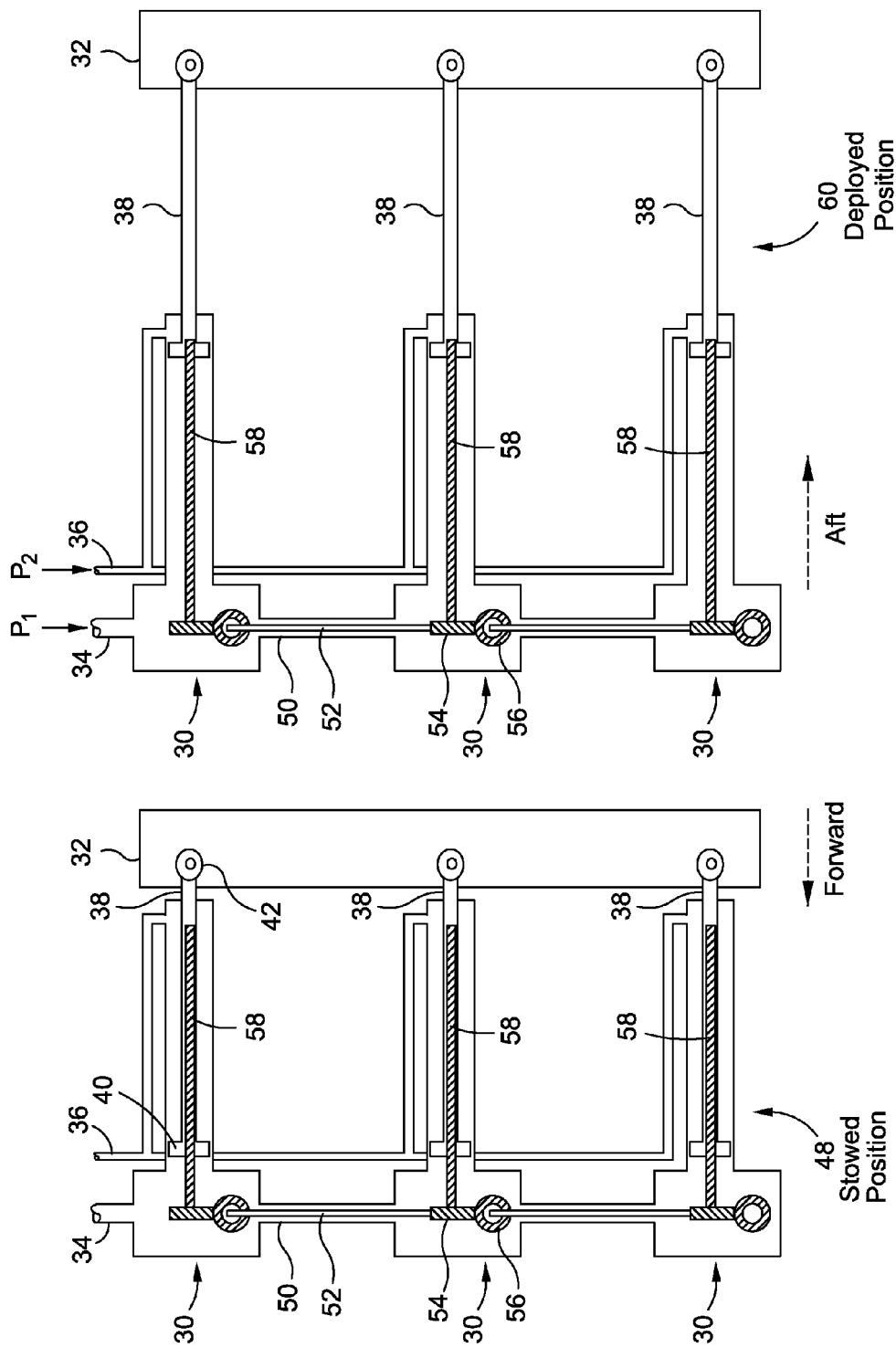

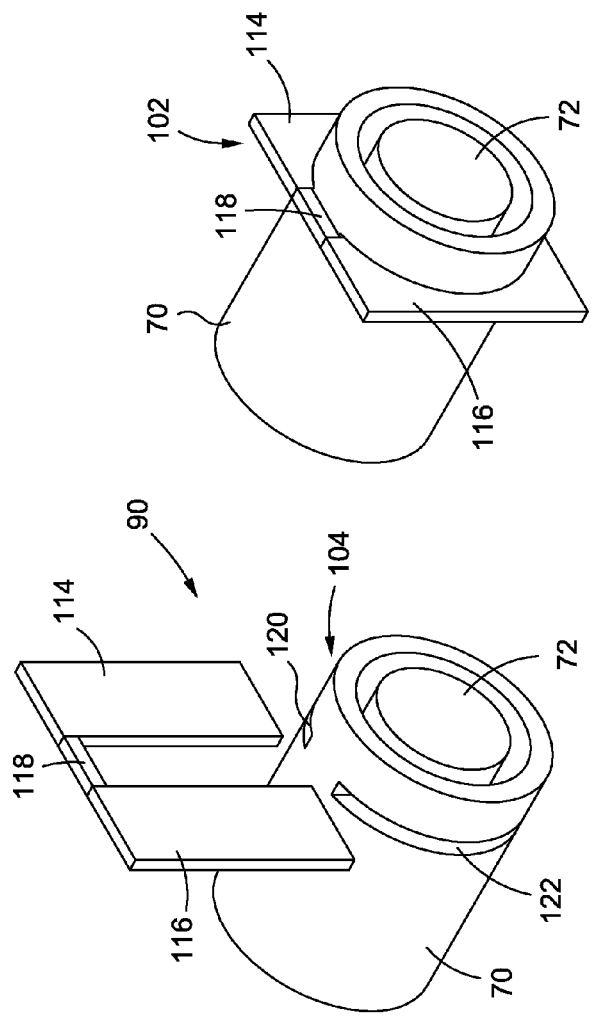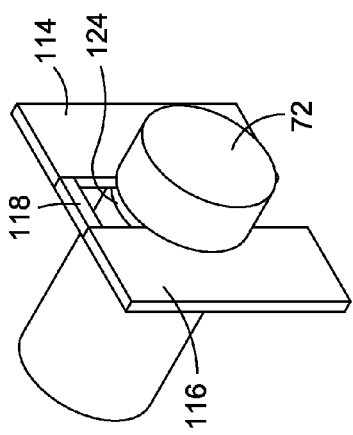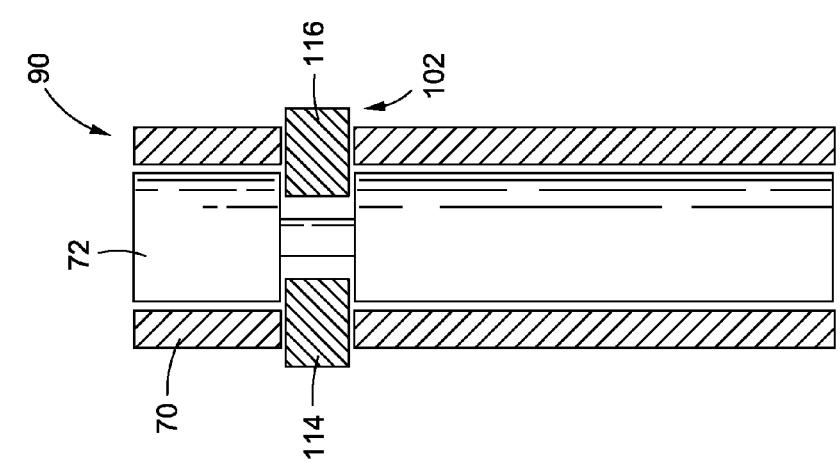

__

THRUST REVERSER AND VARIABLE AREA FAN NOZZLE ACTUATION SYSTEM AND METHOD

FIELD

The disclosure relates generally to thrust reverser systems for engines, and more particularly, to thrust reverser actuation systems and variable area fan nozzle systems for aircraft jet engines.

BACKGROUND

Jet aircraft, such as commercial passenger and military aircraft, use thrust reversers on the aircraft's jet engines to reverse fan exhaust air from a jet engine in order to reduce the aircraft's speed after landing. Such jet aircraft may also use variable area fan nozzles (VAFNs) to improve the propulsive efficiency of the aircraft's jet engines. However, known thrust reversers are actuated by a thrust reverser actuation system (TRAS), and known variable area fan nozzles are actuated by a separate variable area fan actuation system. Such separate actuation systems can result in duplicate synchronization assemblies, duplicate control systems, separate/duplicate VAFN actuators and additional structure to support the mounting of the VAFN actuation components. Such duplication of assemblies, systems and components by the separate TRAS and VAFN actuation systems can increase the overall weight of the engine and aircraft, which can, in turn, reduce fuel efficiency, and in certain cases, reliability.

Accordingly, there is a need in the art for a system and method for actuating a thrust reverser and variable area fan nozzle in a single actuation system that provides advantages over known methods and systems.

SUMMARY

This need for a system and method for actuating a thrust reverser and variable area fan nozzle in a single actuation system is satisfied. As discussed in the below detailed description, embodiments of the system and method may provide significant advantages over existing methods and systems.

In an embodiment of the disclosure, there is provided an actuation system for a gas turbine engine including a thrust reverser and a variable area fan nozzle. The system has a plurality of linear actuators. Each linear actuator has a first outer piston concentric with a second inner piston. The first outer piston is operatively connected to a thrust reverser, and the second inner piston is operatively connected to a variable area fan nozzle. The system further has a piston lock assembly for selectively locking the first outer piston to the second inner piston. The system further has a control system coupled to the plurality of linear actuators for operating the variable area fan nozzle between a stowed position and a deployed position.

In another embodiment of the disclosure, there is provided an actuation system for an aircraft having a jet engine including a thrust reverser and variable area fan nozzle. The system has a plurality of linear actuators. Each linear actuator has an actuator housing. Each linear actuator further has a first outer piston concentric with a second inner piston. The first outer piston is operatively connected to a thrust reverser. The second inner piston is operatively connected to a variable area fan nozzle. The first outer piston and the second inner piston are substantially positioned within the actuator housing. The linear actuator further has a synchronization assembly positioned within the actuator housing for synchronizing the first outer piston and for actuating and synchronizing the second inner piston. The synchronization assembly has a flex shaft, a worm wheel gear, a worm shaft gear, and a lead screw. The system further has a piston lock assembly for selectively locking the first outer piston to the second inner piston. The system further has at least one hydraulic line coupled to the plurality of linear actuators. The system further has a control system coupled to the plurality of linear actuators. The control system is capable of actuating the second inner piston independently of the first outer piston and thus operating the variable area fan nozzle between a stowed position and a deployed position. The control system is further capable of actuating the first outer piston between a thrust reverser stowed position and a thrust reverser deployed position, while the piston lock assembly is engaged.

In another embodiment of the disclosure, there is provided a method for actuating in a single actuation system a thrust reverser and a variable area fan nozzle in an aircraft jet engine. The method comprises providing a combined thrust reverser and variable area fan nozzle actuation system. The system comprises a plurality of linear actuators where each linear actuator comprises a first outer piston concentric with a second inner piston. The first outer piston is operatively connected to a thrust reverser, and the second inner piston is operatively connected to a variable area fan nozzle. The system further comprises a piston lock assembly for selectively locking the first outer piston to the second inner piston. The system further comprises a control system coupled to the plurality of linear actuators. The method further comprises unlocking the piston lock assembly when the first outer piston and the second inner piston are in a stowed position. The method further comprises using the control system to actuate the second inner piston and the variable area fan nozzle independently of the first outer piston and the thrust reverser, so that the second inner piston and the variable area fan nozzle are actuated to a first deployed position. The method further comprises locking the piston lock assembly when the second inner piston and the variable area fan nozzle are in the first deployed position. The method further comprises using the control system to actuate the first outer piston and the thrust reverser, so that the first outer piston and the thrust reverser are actuated to a second deployed position, while the piston lock assembly is locked.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 1C is an illustration of a schematic diagram illustrating a side view of a prior art plurality of actuators and thrust reverser sleeve, where the thrust reverser sleeve is in a stowed position;

FIG. 1D is an illustration of a schematic diagram of the actuators and thrust reverser sleeve of FIG. 1C where the thrust reverser sleeve is in a fully deployed position;

FIG. 10B is an illustration of a partial cross-sectional view of the piston lock assembly of FIG. 10A;

FIG. 10C is an illustration of a front perspective view of the piston lock assembly of FIG. 10A showing the pins in an unlocked position;

FIG. 10D is an illustration of a front perspective view of the piston lock assembly of FIG. 10C showing the pins in a locked position with both the first outer piston and the second inner piston;

FIG. 10E is an illustration of a front perspective view of the piston lock assembly of FIG. 10D showing the pins in a locked position with the second inner piston;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1A:
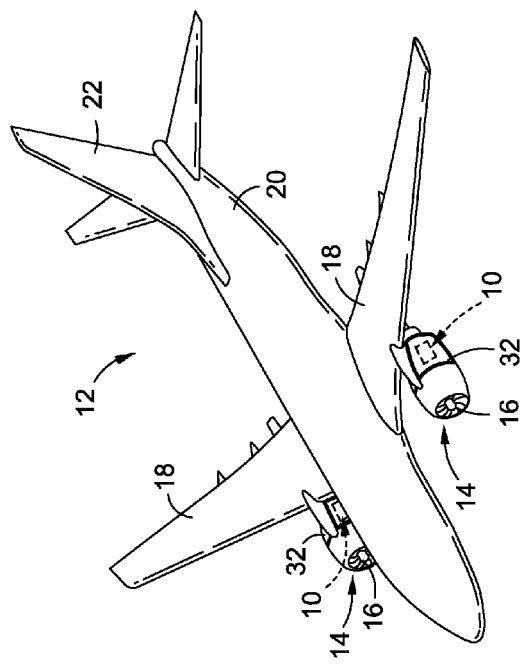
FIG. 1A is an illustration of a perspective view of an aircraft having an exemplary embodiment of an actuation system of the disclosure.

Now referring to the Figures, FIG. 1A is an illustration of a perspective view of an aircraft 12 having an exemplary embodiment of an actuation system 10 of the disclosure. As shown in FIG. 1A, the aircraft 12 has a nacelle 14 with an engine 16 and a thrust reverser 32. The aircraft 12 further has wings 18, a body 20, and a tail 22. FIG. 1A shows where the thrust reverser 32 may be located on the aircraft 12.

Figure 1B:
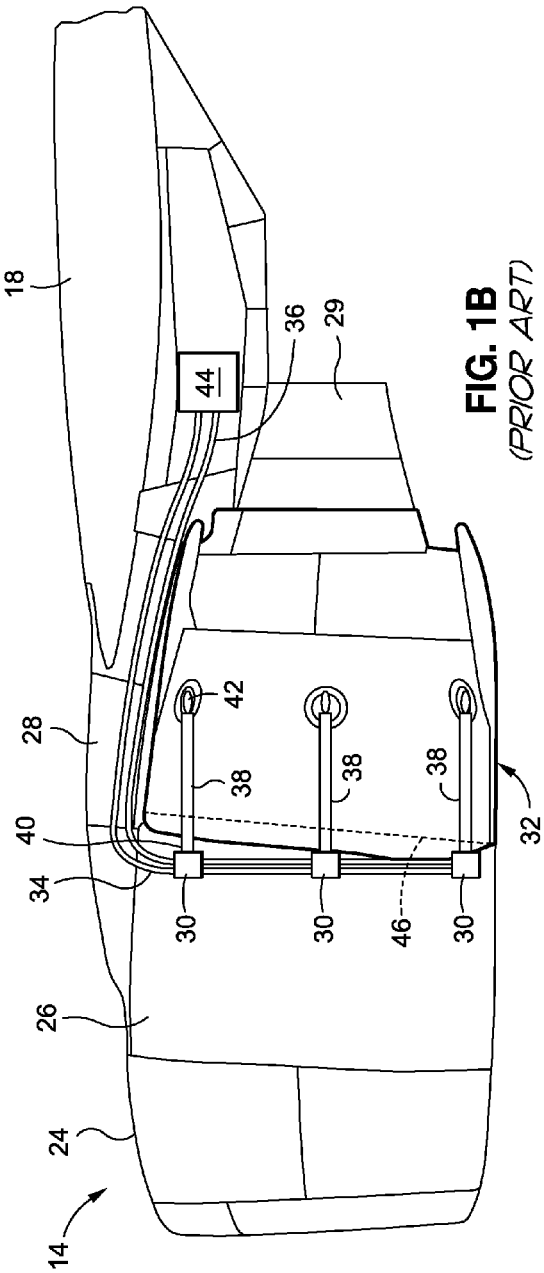
FIG. 1B is an illustration of a side view of a prior art nacelle and thrust reverser for an aircraft.

Referring to the Figures, FIG. 1B is an illustration of a side view of a known aircraft nacelle 14 having a thrust reverser 32. The aircraft nacelle 14 is attached to an aircraft wing 18. The aircraft nacelle 14 may comprise an air inlet 24, a fan cowl 26, a strut 28, a primary air exhaust nozzle 29, a plurality of linear actuators 30, a first hydraulic line 34, a second hydraulic line 36, a control valve 44, and a torque box 46. The thrust reverser 32 reverses fan air exhaust from an engine, thus slowing down an aircraft during landing. There are typically six linear actuators 30 per thrust reverser 32 (three linear actuators 30 per thrust reverser 32 half), and the linear actuators 30 actuate or move the thrust reverser 32. The linear actuators 30 may be connected to the first hydraulic line 34 and the second hydraulic line 36. Each linear actuator 30 may be coupled to a piston 38 having a head end 40 and a rod end 42. The first hydraulic line 34 pressurizes the head end 40 of the piston 38, and the second hydraulic line 36 pressurizes the rod end 42 of the piston 38. The hydraulic pressure is controlled by the control valve 44.

FIG. 1C is an illustration of a schematic diagram illustrating a side view of known linear actuators 30 and thrust reverser 32, where the thrust reverser 32 is in a stowed position 48. The head end 40 of each piston 38 is coupled to each linear actuator 30 via a lead screw 58. The rod end 42 of each piston 38 is coupled to the thrust reverser 32. FIG. 1D is an illustration of a schematic diagram of the linear actuators 30 and thrust reverser 32 of FIG. 1C where the thrust reverser 32 is in a fully deployed position 60. As shown in FIG. 1D, when hydraulic pressure $P_1$ is applied to the pistons 38, the pistons 38 deploy or extend, and the thrust reverser 32 moves aft to the deployed position 60. When hydraulic pressure $P_2$ (FIG. 1D) is retracted, the pistons 38 stow or retract, and the thrust reverser sleeve 32 moves forward to the stowed position 48, as shown in FIG. 1C. Alternatively, hydraulic pressure $P_2$ can be applied simultaneously with hydraulic pressure $P_1$ to deploy the pistons 38. The pistons 38 are moved together via synchronization of a flex shaft 52 within a hydraulic tube 50, a worm wheel gear 54, and a worm shaft gear 56.

Figure 2:
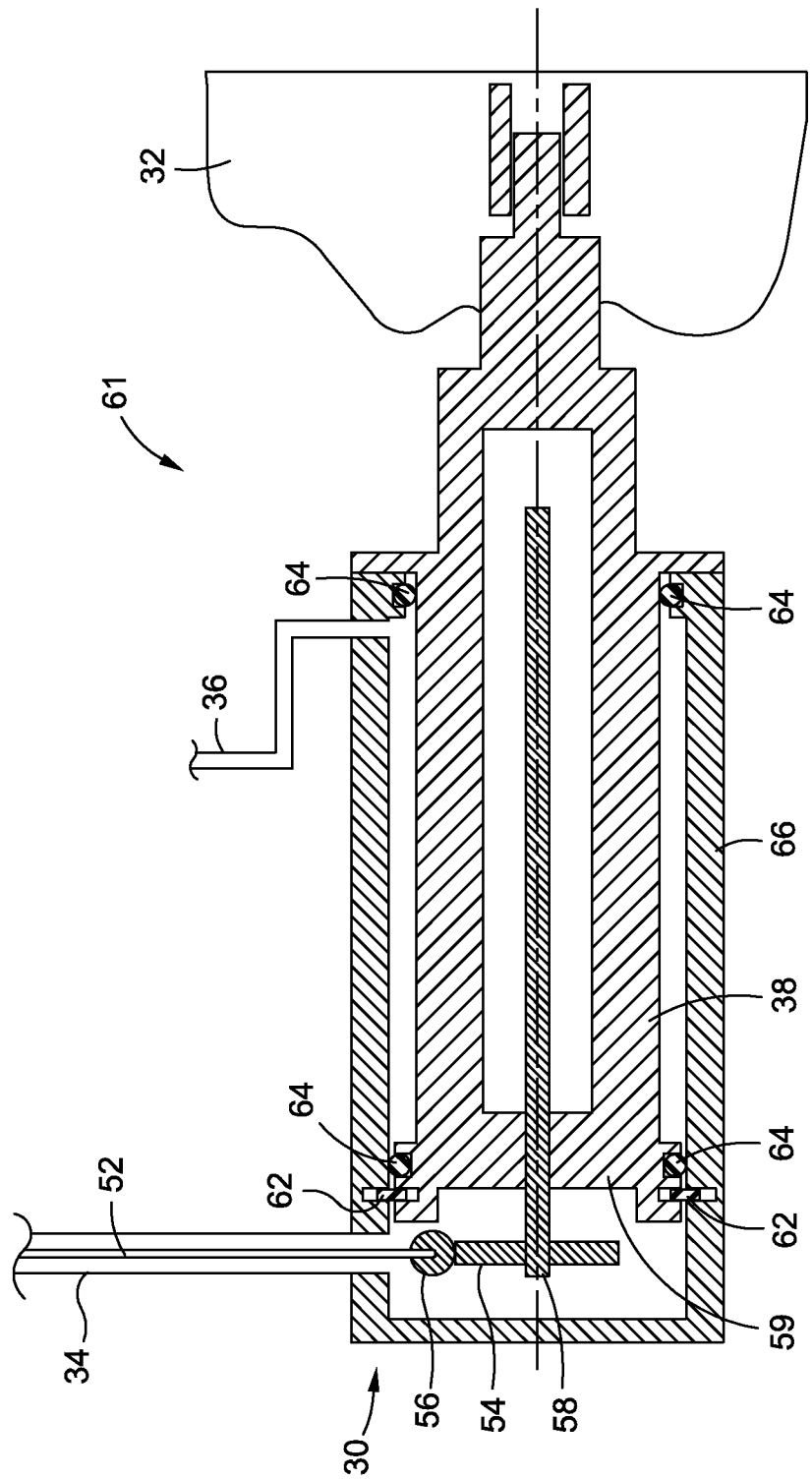
FIG. 2 is an illustration of a schematic diagram illustrating a cut-away side view of a prior art thrust reverser actuation system.

FIG. 2 is an illustration of a schematic diagram illustrating a cut-away side view of a known thrust reverser actuation system 61. The thrust reverser actuation system 61 comprises the linear actuator 30 coupled to the piston 38 via the lead screw 58. The piston 38 actuates the thrust reverser 32. Hydraulic fluid is supplied and hydraulic pressure is applied to the linear actuator 30 and the piston 38 via the first hydraulic line 34 and the second hydraulic line 36. The piston 38 is moved via the synchronization of the flex shaft 52, the worm wheel gear 54, and the worm shaft gear 56. The piston 38 is locked or attached to actuator housing 66 via piston securing pins 62. Hydraulic seals 64 located in the piston 38 and the actuator housing 66 can prevent leaking of hydraulic fluid.

Figure 3:
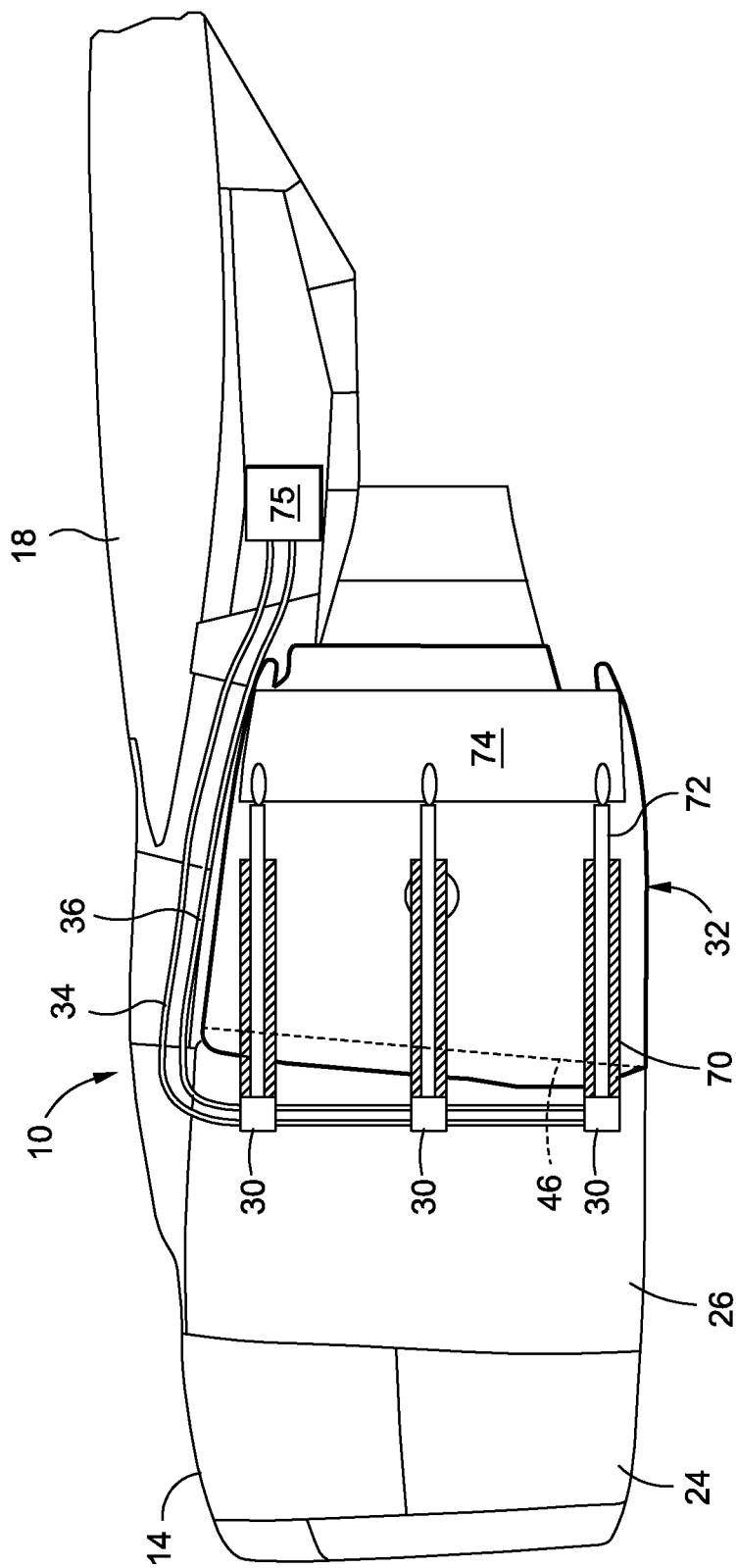
FIG. 3 is an illustration of a side view of one of the embodiments of an actuation system of the disclosure used with a thrust reverser on a nacelle of an aircraft.
Figure 4:
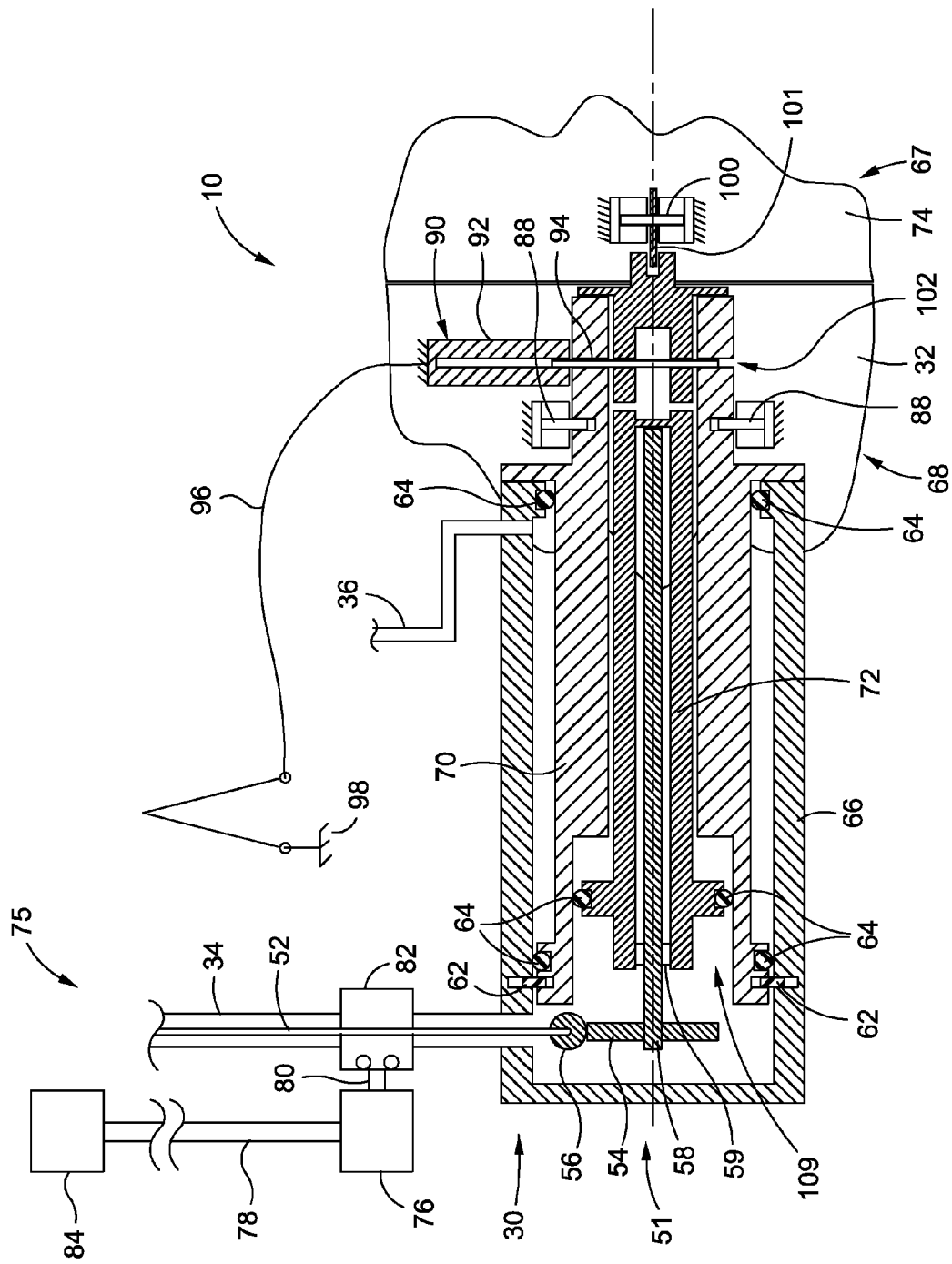
FIG. 4 is an illustration of a schematic diagram illustrating a cut-away side view of one of the embodiments of an actuation system of the disclosure.
Figure 17:
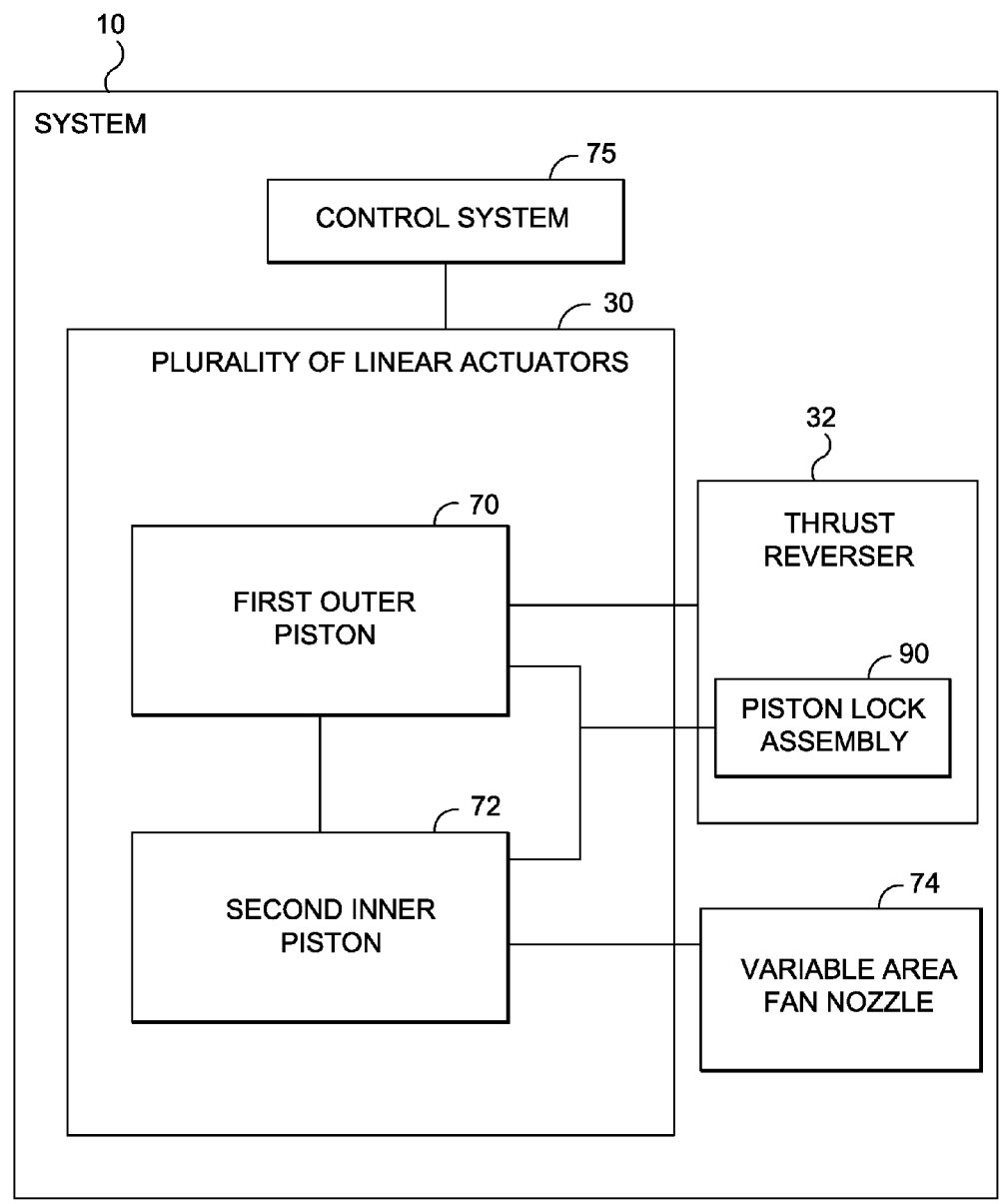
FIG. 17 is a block diagram illustrating one of the embodiments of an actuation system of the disclosure.

FIG. 3 is an illustration of a side view of one of the embodiments of an actuation system 10 of the disclosure used with a thrust reverser 32 on a nacelle 14 of an aircraft 12 (see FIG. 1). The nacelle 14 is preferably attached to the wing 18 of the aircraft 12 (FIG. 1A). The nacelle 14 may comprise air inlet 24, fan cowl 26, strut 28, air exhaust nozzle 29, a plurality of linear actuators 30, first hydraulic line 34, second hydraulic line 36, torque box 46, and control system 75. FIG. 4 is an illustration of a schematic diagram illustrating a cut-away side view of one of the embodiments of the actuation system 10 of the disclosure. FIG. 17 is a block diagram illustrating one of the embodiments of the actuation system 10 of the disclosure. As shown in FIGS. 3, 4 and 17, in an embodiment of the disclosure, there is provided the actuation system 10 for a gas turbine engine 16 including the thrust reverser 32 and a variable area fan nozzle 74. Preferably, the engine 16 is a jet engine used in an aircraft 12 (see FIG. 1A). The actuation system 10 is a single actuation system that is common to both the thrust reverser 32 and the variable area fan nozzle 74 and the actuation system 10 has an actuator common to both the thrust reverser 32 and the variable area fan nozzle 74.

The actuation system 10 comprises a plurality of linear actuators 30. Each linear actuator 30 comprises a first outer piston 70 concentric with a second inner piston 72. Preferably, the first outer piston 70 comprises a thrust reverser actuation system (TRAS) piston or another suitable piston. Preferably, the second inner piston 72 comprises a variable area fan nozzle (VAFN) piston or another suitable piston. The second inner piston 72 is preferably slidably located within the inner volume of the first outer piston 70, such that a portion of the second inner piston 72 extends exteriorly from the first outer piston 70 when the second inner piston 72 is actuated independently of the first outer piston 70 (see FIG. 6). The first outer piston 70 may be connected to the actuator housing 66 via one or more piston securing pins 62. The piston securing pins 62 release or unlock automatically when deploy hydraulic pressure is applied to the first outer piston 70. The first outer piston 70 is operatively connected to the thrust reverser 32 via one or more thrust reverser pins 88 which may be in the form of gimbal pins or other suitable pins. In the embodiment shown in FIG. 4, the second inner piston 72 is operatively connected to a variable area fan nozzle 74 via one or more variable area fan nozzle pins 100 in the variable area fan nozzle 74 that are coupled to a linking mechanism 101. The linking mechanism 101 links the second inner piston 72 to the variable area fan nozzle pin 100 of the variable area fan nozzle 74. The linking mechanism 101 may be in the form of a clevis fastener with a clevis, a clevis pin, and a link element, or may be in the form of another suitable fastener. The second inner piston 72 moves axially only, and the variable area fan nozzle 74 moves both axially and radially. The variable area fan nozzle pins 100. The linking mechanism 101 accommodates axial and radial motion of the variable area fan nozzle 74. As shown in FIG. 4, the second inner piston 72 may be connected to the linear actuator 30 via lead screw 58 and lead nut 59. Hydraulic seals 64 coupled to the first outer piston 70 and the second inner piston 72 or to the actuator housing 66 may be added to prevent leaking of hydraulic fluid.

Each linear actuator 30 of the actuation system 10 preferably comprises a synchronization assembly 51 (see FIG. 4) driven or powered by a control system 75 (see FIGS. 4 and 18) for synchronizing the first outer piston 70 and for actuating and synchronizing the second inner piston 72. The synchronization assembly 51 preferably comprises a flex shaft 52 coupled to a worm shaft gear 56, which is coupled to a worm wheel gear 54, which is coupled to the lead screw 58. The flex shaft 52 is driven by a motor element 76 (see FIG. 4) of the control assembly 75 (see FIG. 4) and turns the worm shaft gear 56. The worm shaft gear 56 turns the worm wheel gear 54. The worm wheel gear 54 turns the lead screw 58. The lead screw 58 causes the second inner piston 72 to travel up and down and back and forth. However, when the motor element 76 is powered, the piston lock assembly is locked and only the second inner piston 72 moves (VAFN deployment). When the first outer piston 70 and the second inner piston 72 are locked or constrained to together, they are actuated or moved together by common rotation of the synchronization assembly 51.

Figure 5:
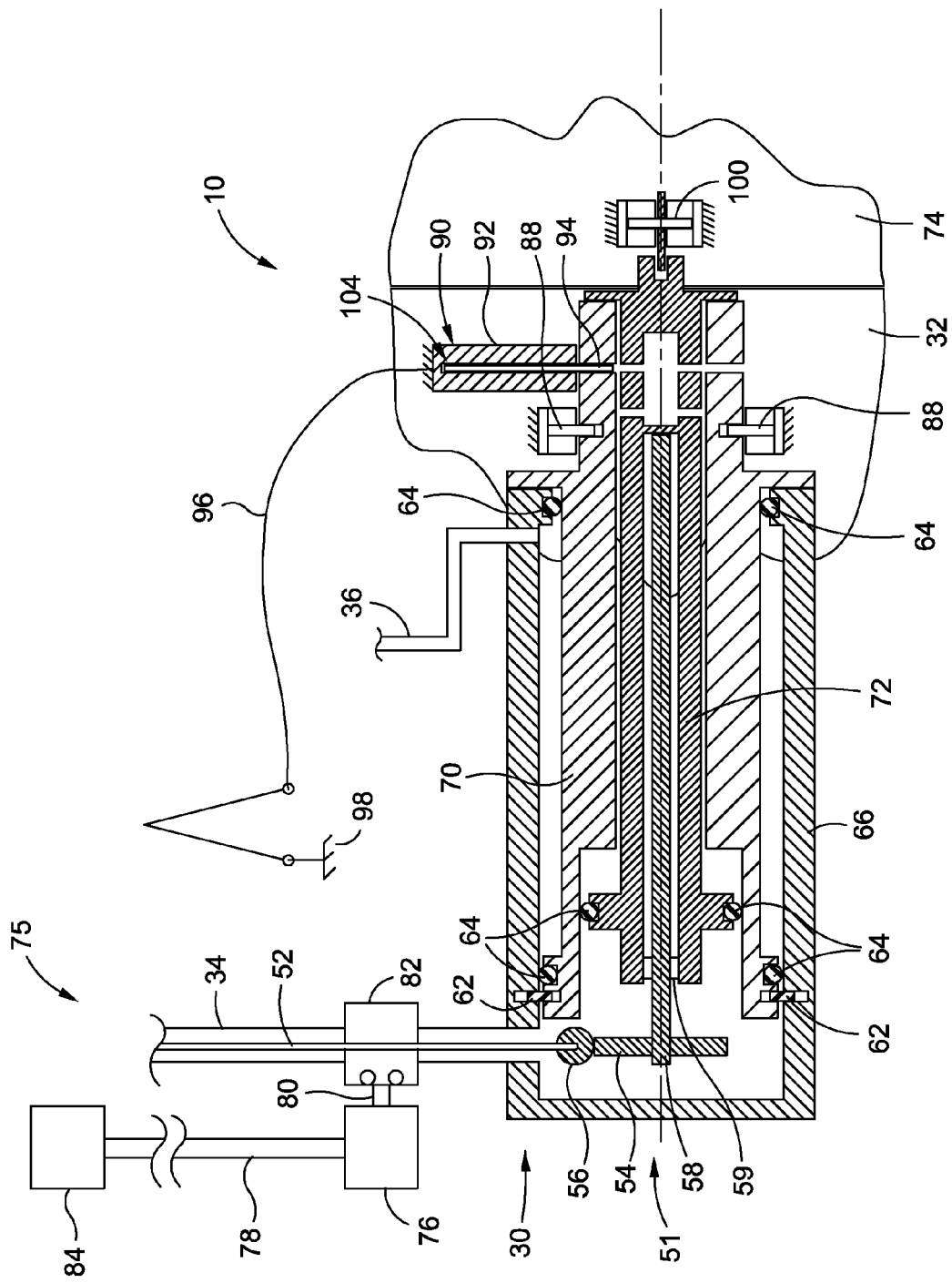
FIG. 5 is an illustration of a schematic diagram illustrating a cut-away side view of the actuation system of FIG. 4 showing a piston lock assembly in an unlocked position.

As shown in FIGS. 4 and 17, the actuation system 10 further comprises a piston lock assembly 90 for selectively locking the first outer piston 70 to the second inner piston 72 so that they may be actuated together or separately. In one embodiment of the piston lock assembly 90, as shown in FIG. 4, the piston lock assembly 90 comprises a solenoid 92 coupled to an extendable and retractable pin 94. The solenoid 92 actuates the extendable and retractable pin 94, which in turn, couples the first outer piston 70 to the second inner piston 72, such that they are constrained to move together, or decouples the first outer piston 70 from the second inner piston 72, such that they are able to move independently. The piston lock assembly 90 may be connected to a first supply line 96 preferably attached to a controller element 98, such as a solenoid controller element or other suitable controller element, in order to power the solenoid 92. The first supply line 96 may comprise a power supply line, such as a 28 volt direct current (VDC) line, or another suitable supply line. Preferably, the piston lock assembly 90 is electrically powered. As shown in FIG. 4, the extendable and retractable pin 94 is in an extended or locked position 102 and locks the first outer piston 70 and the second inner piston 72 together. As shown in FIG. 5, the extendable and retractable pin 94 is in a retracted or unlocked position 104 and unlocks the first outer piston 70 and the second inner piston 72.

Figure 10A:
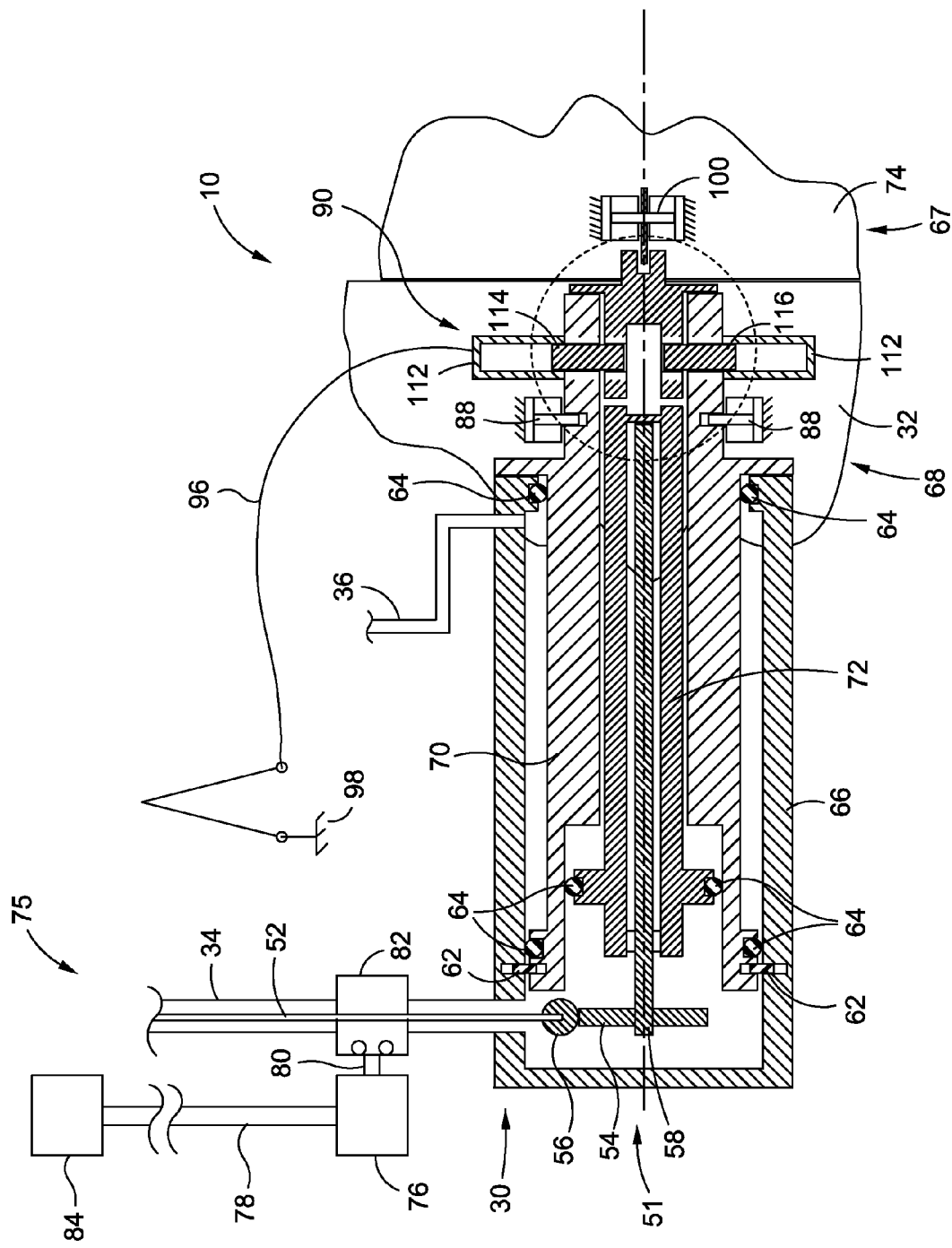
FIG. 10A is an illustration of a schematic diagram illustrating a cut-away side view of another one of the embodiments of an actuation system of the disclosure showing another embodiment of a piston lock assembly.

FIG. 10A is an illustration of a schematic diagram illustrating a cut-away side view of another one of the embodiments of the actuation system 10 of the disclosure showing another embodiment of the piston lock assembly 90. In another embodiment of the piston lock assembly 90, as shown in FIGS. 10A-10E, the piston lock assembly 90 comprises a solenoid 112 coupled to a pair of corresponding extendable and retractable pins 114, 116. The pins 114, 116 may be connected by a connector portion 118 (see FIG. 10C) and are preferably designed for insertion into two corresponding first outer piston slots 120, 122 (see FIG. 10C) formed in the first outer piston 70 and designed for insertion into a corresponding second inner piston slot 124 formed in the second inner piston 72 (see FIG. 10E). As shown in FIG. 10A, the piston lock assembly 90 may be connected to a first supply line 96 preferably attached to a controller element 98, such as a solenoid controller element or other suitable controller element, in order to power the aligned solenoids 112. The first supply line 96 may comprise a power supply line such as a 28 volt direct current (VDC) line, or another suitable supply line. FIG. 10B is an illustration of a partial cross-sectional view of the piston lock assembly 90 of FIG. 10A. FIG. 10B shows the piston lock assembly 90 in a locked position 102 with the pins 114, 116 locking the first outer piston 70 and the second inner piston 72 together. FIG. 10C is an illustration of a front perspective view of the piston lock assembly 90 of FIG. 10A in an unlocked position 104 showing the pins 114, 116 uncoupled from the corresponding first outer piston slots 120, 122 and uncoupled from the corresponding second inner piston slot 124 (see FIG. 10E). FIG. 10D is an illustration of a front perspective view of the piston lock assembly 90 of FIG. 10C in a locked position 102 showing the pins 114, 116 inserted into the corresponding first outer piston slots 120, 122 (see FIG. 10C) and the corresponding second inner piston slot 124 (see FIG. 10E) to lock the first outer piston 70 and the second inner piston 72 together. FIG. 10E is an illustration of a front perspective view of the piston lock assembly 90 of FIG. 10D showing the pins 114, 116 inserted into the corresponding second inner piston slot 124 of the second inner piston 72. This embodiment is advantageous because it allows the pins 114, 116 to be moved into and out of the first outer piston slots 120, 122 and the second inner piston slot 124 with some amount of relative axial rotation of the first outer piston 70 and the second inner piston 72.

Figure 18:
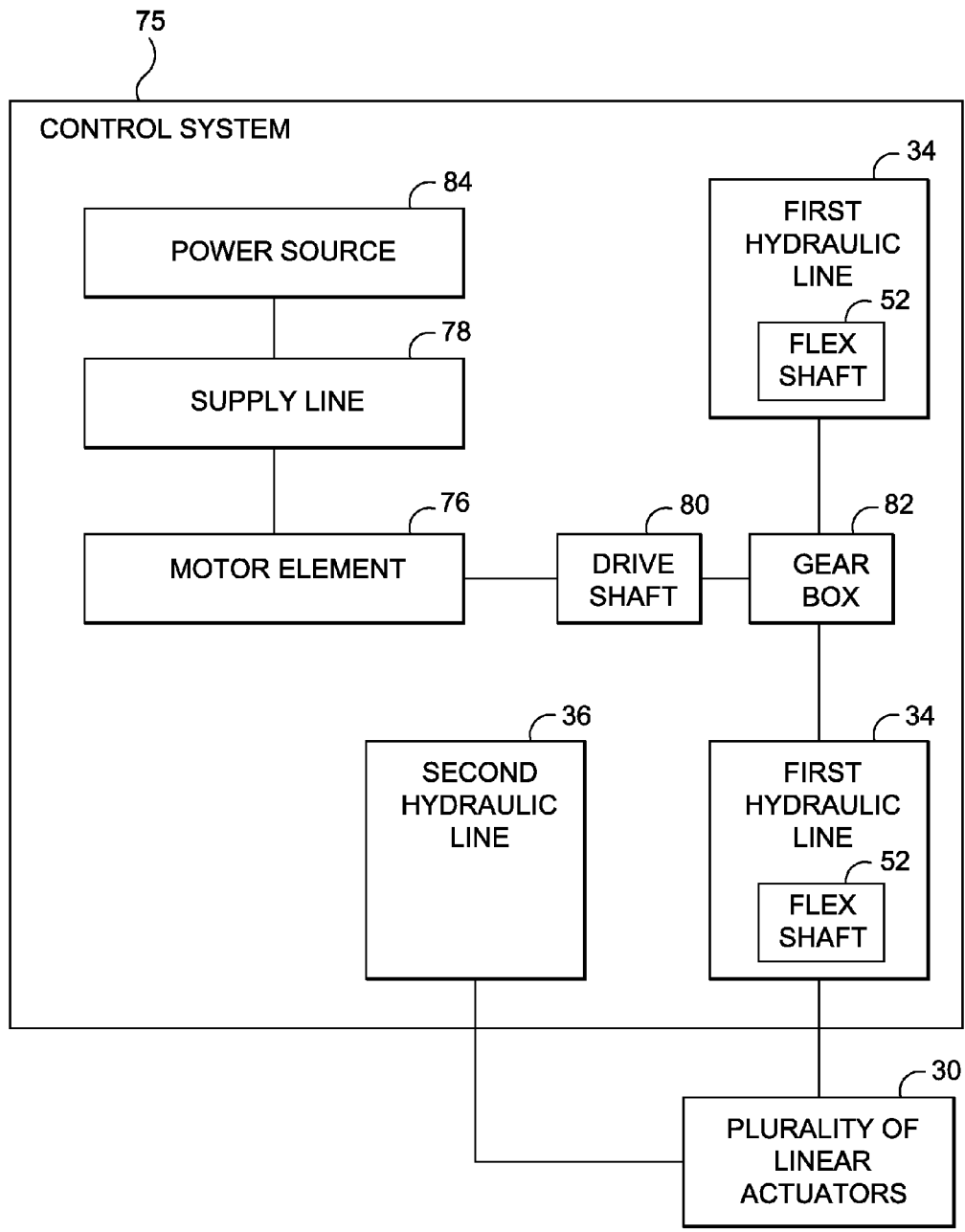
FIG. 18 is a block diagram illustrating one of the embodiments of a control system for an actuation system of the disclosure; and, FIG. 19 is a flow diagram illustrating an exemplary method of the disclosure.

As shown in FIGS. 3, 4, 17 and 18, the actuation system 10 further comprises a control system 75 coupled to the plurality of linear actuators 30. The control system 75 is capable of actuating the second inner piston 72 independently of the first outer piston 70 and thus operating the variable area fan nozzle 74 between a variable area variable area fan nozzle stowed position 67 (see FIG. 4) and a variable area fan nozzle fully deployed position 106 (see FIG. 6). The control system 75 is further capable of actuating the first outer piston 70 between a thrust reverser stowed position 68 (see FIG. 4) and a thrust reverser deployed position 110 (see FIG. 12), while the piston lock assembly 90 is engaged. FIG. 18 is a block diagram illustrating one of the embodiments of the control system 75 for the actuation system 10 of the disclosure. As shown in FIGS. 4 and 18, the control system 75 comprises a power source 84 such as an electrical power source, a hydraulic power source, a pneumatic power source, or another suitable power source. The control system 75 further comprises a second supply line 78 connected to the power source 84. The second supply line 78 may comprise a hydraulic line, a 115 volt alternating current (VAC) line, or another suitable supply line. The control system 75 further comprises a motor element 76 connected to the second supply line 78. The motor element 76 may comprises an electric motor, a hydraulic motor, a pneumatic motor, or another suitable motor element. The motor element 76 may be mounted to the torque box 46 (see FIG. 3). The control system 75 further comprises a drive shaft 80 and a gear box 82, where the drive shaft 80 is connected between the motor element 76 and the gear box 82. The control system 75 further comprises the flex shaft 52 within the first hydraulic line 34. The flex shaft 52 runs through the gear box 82 and is connected to linear actuator 30 via the worm shaft gear 56. The motor element 76 drives the flex shaft 52 via the drive shaft 80 and the gear box 82 to actuate the variable area fan nozzle 74. The control system 75 may further comprise the second hydraulic line 36 that supplies hydraulic fluid and applies hydraulic pressure to drive the first outer piston 70 and the attached thrust reverser 32. The control system 75 may comprise an electrical system, a hydraulic system, a combination of an electrical and hydraulic system, or another suitable control system.

Figure 11:
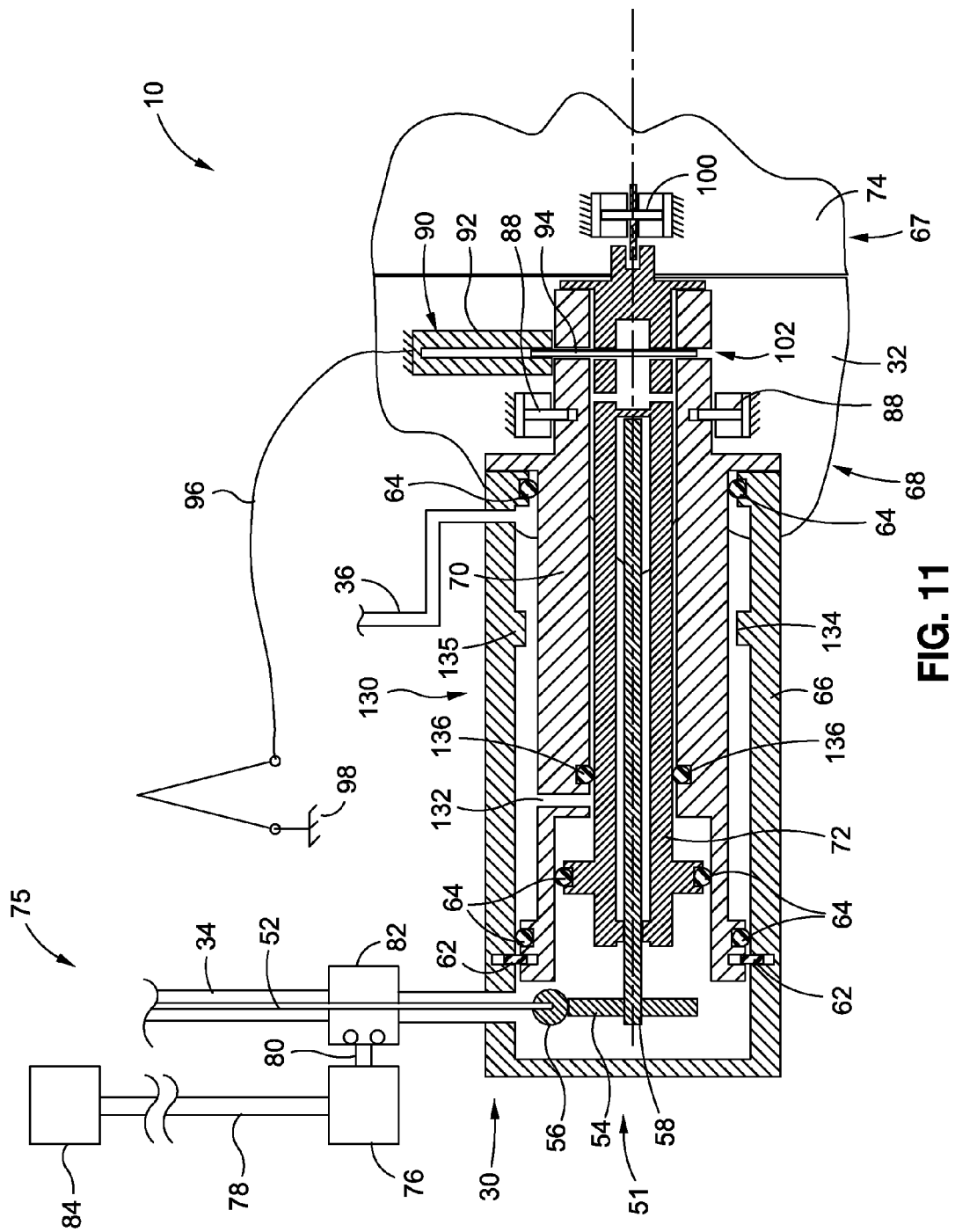
FIG. 11 is an illustration of a schematic diagram illustrating a cut-away side view of yet another one of the embodiments of an actuation system of the disclosure with a hydraulic assist assembly.

FIG. 11 is an illustration of a schematic diagram illustrating a cut-away side view of yet another one of the embodiments of an actuation system 10 of the disclosure where the actuation system 10 further comprises a hydraulic powered assembly 130. In this embodiment each linear actuator 30 of the actuation system 10 further comprises the hydraulic powered assembly 130. The hydraulic powered assembly 130 may be added to the actuation system 10 to assist with hydraulic force, to facilitate actuation of the second inner piston 72 and to reduce retract loads on the lead screw 58 and the lead nut 59. The hydraulic powered assembly 130 aids the lead screw 58 in retracting the variable area fan nozzle 74 when loads are high. Alternatively, the hydraulic powered assembly 130 can retract the variable area fan nozzle 74 with no assistance from the lead screw 58. As shown in FIG. 11, the hydraulic powered assembly 130 comprises one or more flow passages 132 formed through the first outer piston 70. The hydraulic powered assembly 130 further comprises one or more stop elements 134 formed at one or more interior portions 135 of the actuator housing 66. The hydraulic powered assembly 130 further comprises one or more hydraulic powered assembly seal elements 136 that may be inserted between the first outer piston 70 and the second inner piston 72. The variable area fan nozzle 74 is shown in the variable area fan nozzle stowed position 67, and the thrust reverser 32 is shown in the thrust reverser stowed position 68. The pin lock assembly 90 is shown in a locked position 102.

Figure 12:
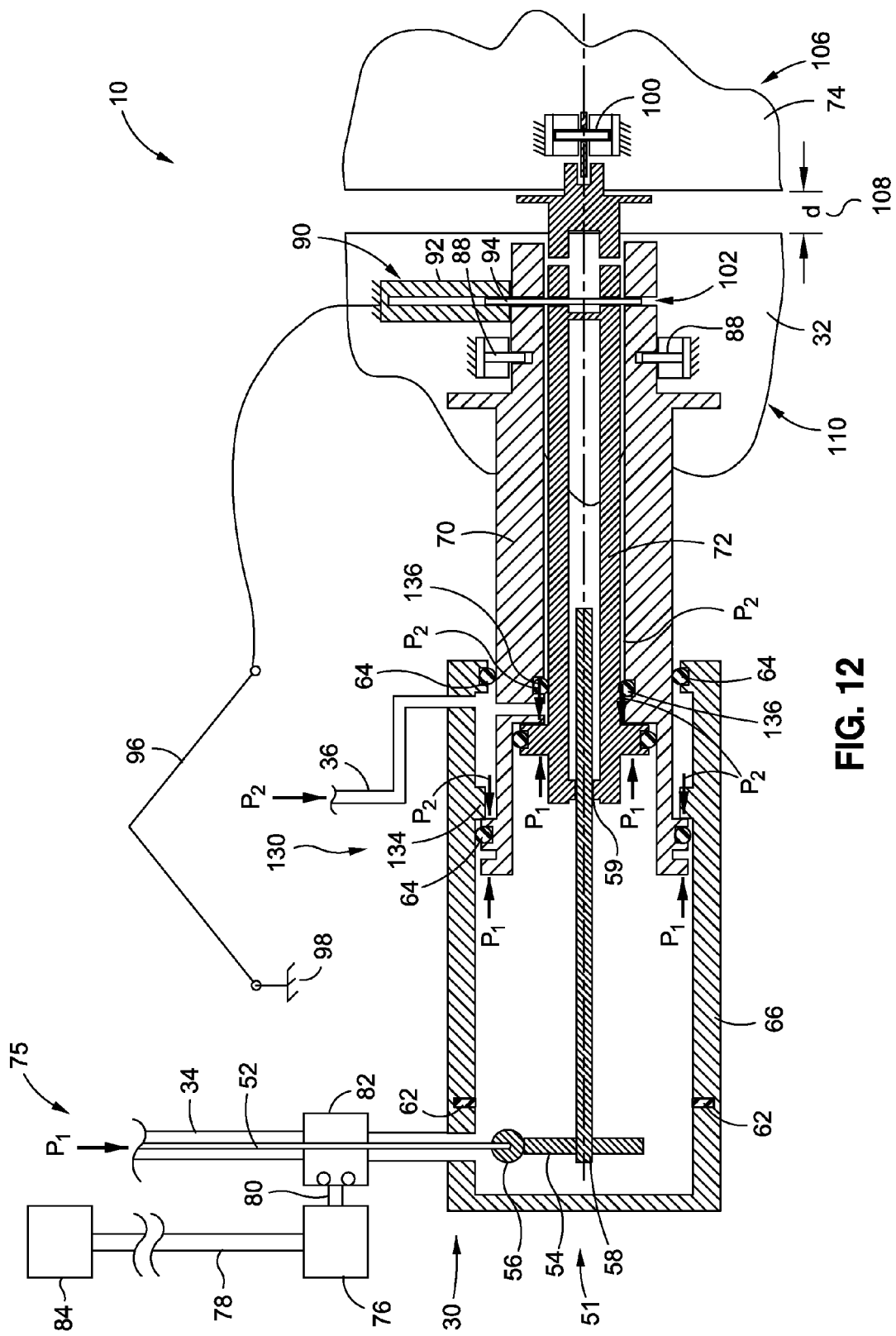
FIG. 12 is an illustration of a schematic diagram illustrating a cut-away side view of the actuation system of FIG. 11 showing hydraulic pressure being applied and a first outer piston and a second inner piston in a fully deployed position.

FIG. 12 is an illustration of a schematic diagram illustrating a cut-away side view of the actuation system 10 of FIG. 11 showing hydraulic pressure $P_1$ being applied from the first hydraulic line 34 and applied to actuate the first outer piston 70 and the attached thrust reverser 32 and to actuate the second inner piston 72 and the attached variable area fan nozzle 74. The variable area fan nozzle 74 is shown in the variable area fan nozzle fully deployed position 106, and the thrust reverser 32 is shown in the thrust reverser fully deployed position 110. The piston lock assembly 90 is shown in a locked position 102. The variable area fan nozzle 74 is deployed a distance (d) 108 from the thrust reverser 32. The distance (d) 108 may be, for example, four (4) inches or another suitable distance. When the variable area fan nozzle 74 is moved from the stowed position 67 to the fully deployed position 106, the throat area (not shown) of the variable area fan nozzle 74 is preferably increased in order to reduce the velocity of fan flow exhaust out of the variable area fan nozzle 74 and to thereby reduce environmental jet engine noise levels. For example, when the variable area fan nozzle 74 is in a fully deployed position 106, the throat area may be at a maximum as may be desired for high thrust settings of the engine 16 (see FIG. 1), such as during take-off and climb and where noise reduction is also desired in order to reduce environmental jet engine noise levels. When the variable area fan nozzle 74 is moved to the stowed position 67, the throat area may be minimized or placed in an optimal position for lower engine thrust settings as may be desired for cruise flight where noise reduction is not required but where nozzle efficiency dictates a reduced throat area of the variable area fan nozzle 74.

Figure 13:
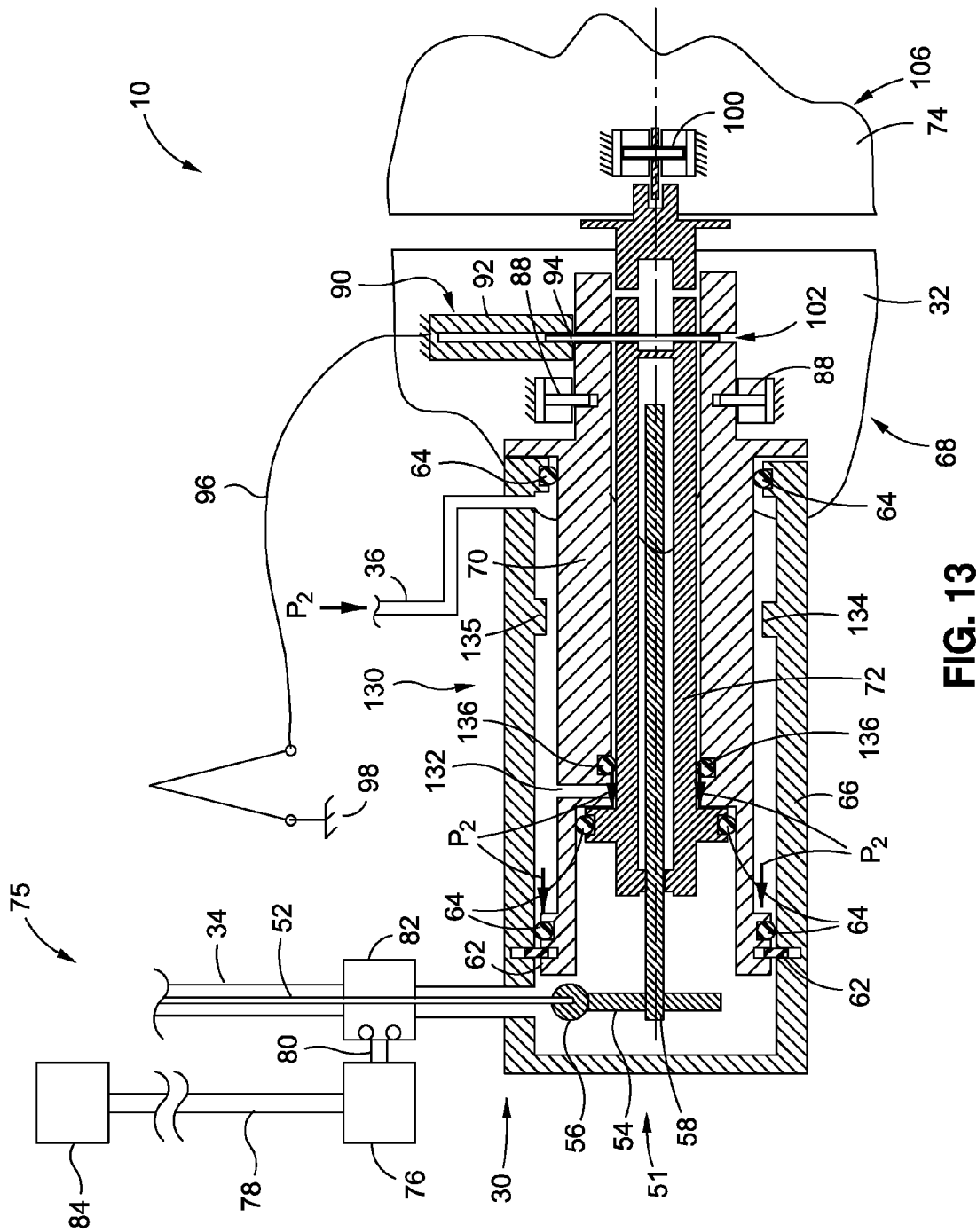
FIG. 13 is an illustration of a schematic diagram illustrating a cut-away side view of the actuation system of FIG. 11 showing hydraulic stow pressure being applied and a first outer piston in a stowed position and the piston lock assembly in a locked position.

FIG. 13 is an illustration of a schematic diagram illustrating a cut-away side view of the actuation system 10 of FIG. 11 showing hydraulic stow pressure $P_2$ being applied from the second hydraulic line 36 and applied to retract the first outer piston 70 and the thrust reverser 32 to a thrust reverser stowed position 68. The variable area fan nozzle 74 is shown in the variable area fan nozzle fully deployed position 106. The thrust reverser 32 is shown in the thrust reverser stowed position 68. The piston lock assembly 90 is shown in the locked position 102.

Figure 14:
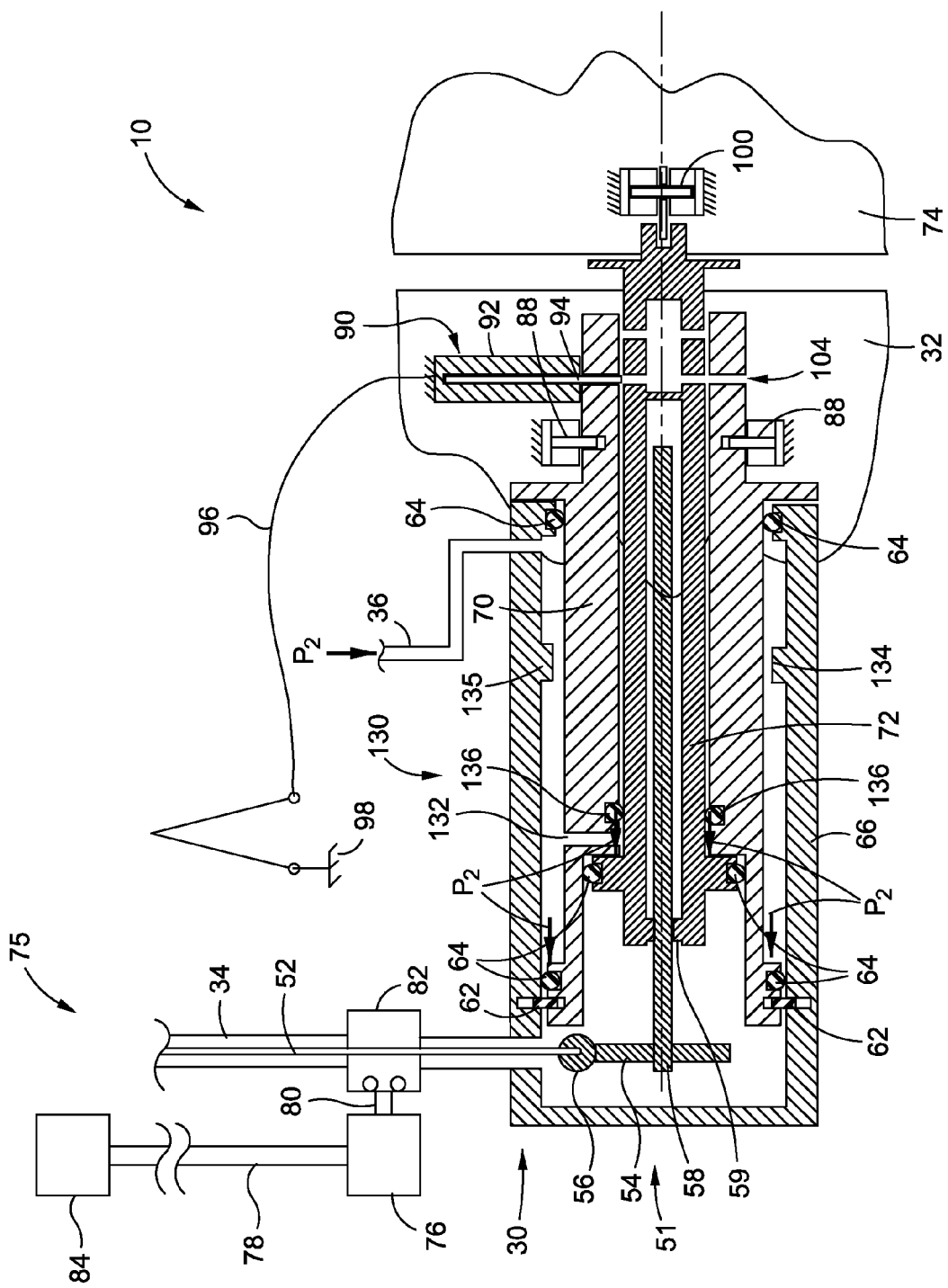
FIG. 14 is an illustration of a schematic diagram illustrating a cut-away side view of the actuation system of FIG. 11 showing hydraulic pressure being applied and the piston lock assembly in an unlocked position.

FIG. 14 is an illustration of a schematic diagram illustrating a cut-away side view of the actuation system 10 of FIG. 11 showing additional hydraulic pressure $P_2$ being applied from the second hydraulic line 36 and applied to retract the second inner piston 72 and the variable area fan nozzle 74. The additional hydraulic pressure $P_2$ may be applied in addition to, or instead of, the motor element 76 driving the synchronization assembly 51 to retract the second inner piston 72 and the variable area fan nozzle 74. Prior to retracting the second inner piston 72, the hydraulic pressure $P_2$ may be turned off momentarily to unload the second inner piston 72. An additional deploy load from the motor element 76 may also be needed to unload the second inner piston 72 air load on the variable area fan nozzle 74. The piston lock assembly 90 is shown in the unlocked position 104.

Figure 15:
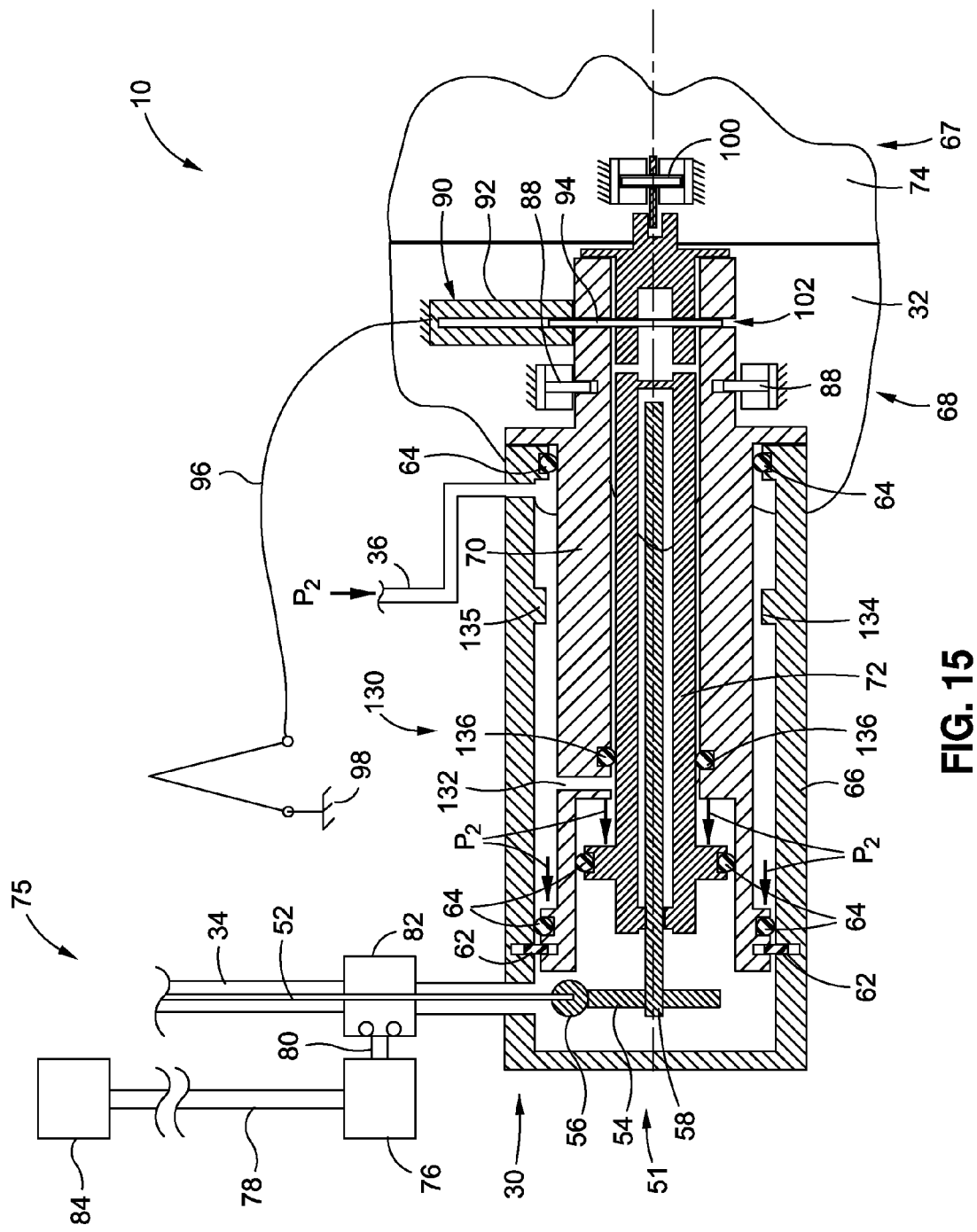
FIG. 15 is an illustration of a schematic diagram illustrating a cut-away side view of the actuation system of FIG. 11 showing hydraulic pressure being applied and a second inner piston in a stowed position and the piston lock assembly in a locked position.

FIG. 15 is an illustration of a schematic diagram illustrating a cut-away side view of the actuation system 10 of FIG. 11 showing additional hydraulic pressure $P_2$ being applied from the second hydraulic line 36 and applied to stow the second inner piston 72 and the variable area fan nozzle 74. The additional hydraulic pressure $P_2$ may be applied in addition to, or instead of, the motor element 76 driving the synchronization assembly 51 to retract the second inner piston 72 and the variable area fan nozzle 74. The variable area fan nozzle 74 is shown in the variable area fan nozzle stowed position 67. The thrust reverser 32 is shown in the thrust reverser stowed position 68. The piston lock assembly 90 is shown in the locked position 102.

Figure 16:
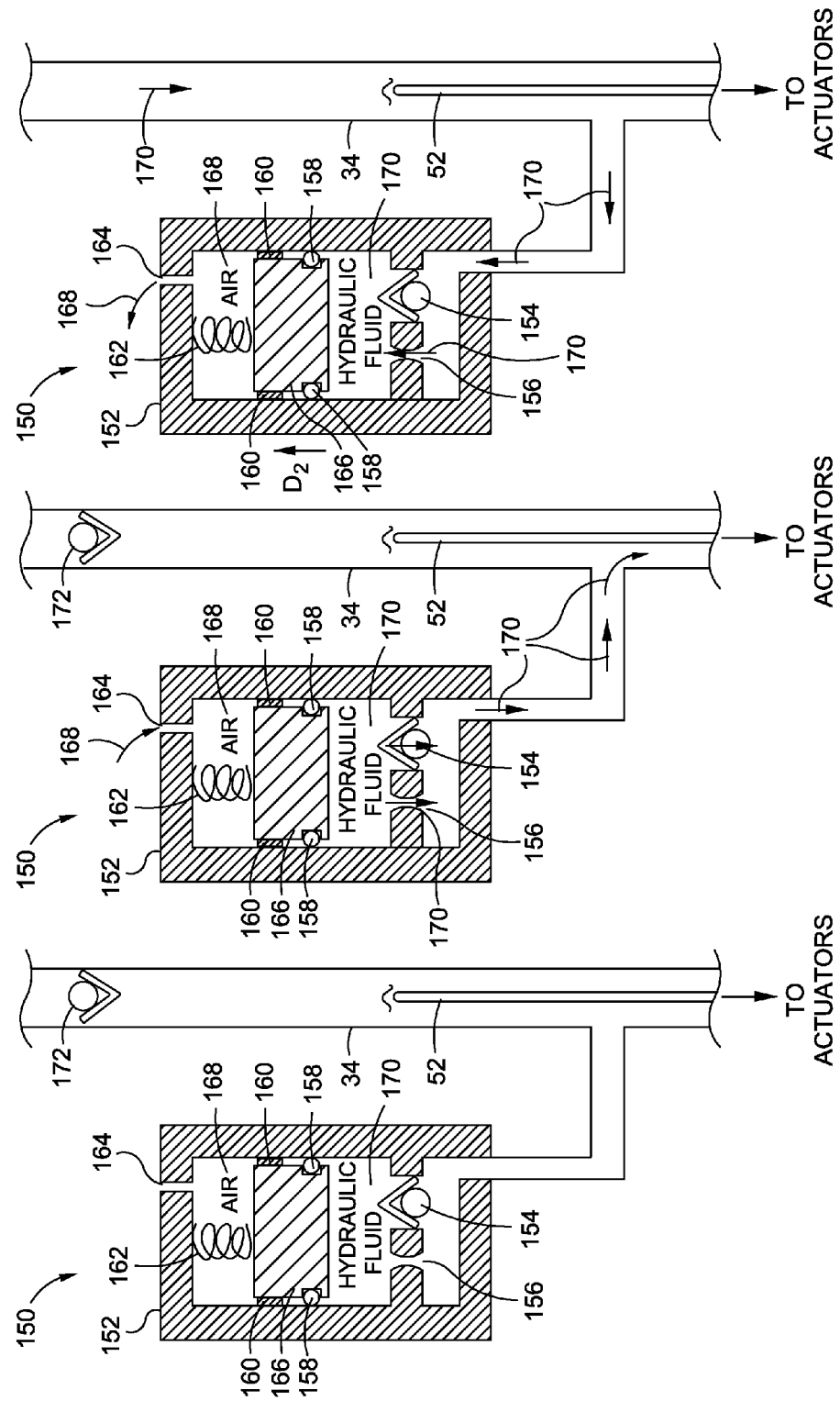
FIG. 16A is an illustration of a schematic diagram illustrating an embodiment of an accumulator assembly for use with one of the embodiments of an actuation system of the disclosure.
FIG. 16B is an illustration of a schematic diagram of the accumulator assembly of FIG. 16A showing hydraulic fluid flowing out of the accumulator assembly when the variable area fan nozzle is deploying.
FIG. 16C is an illustration of a schematic diagram of the accumulator assembly of FIG. 16A showing hydraulic fluid flowing into the accumulator assembly when the thrust reverser is deploying.

In another embodiment as shown in FIGS. 16A-16C, the actuation system 10 may further comprise an accumulator assembly 150. The accumulator assembly 150 may be used for storing and supplying hydraulic fluid 170 (see FIG. 16A) to the second inner piston 72 which is preferably in the form of the variable area fan nozzle piston, when the second inner piston 72 deploys. The accumulator assembly 150 may be used when a hydraulic line check valve 172 is present in the first hydraulic line 34 that is connected to the plurality of linear actuators 30 (see also FIG. 4). When the thrust reverser 32 is in the thrust reverser stowed position 68 (see FIG. 4), the hydraulic line check valve 172 isolates the thrust reverser 32 from aircraft hydraulic return line pressure. This can create a vacuum downstream of the hydraulic line check valve 172 when deploying the variable area fan nozzle 74 to a variable area fan nozzle fully deployed position 106 (see FIG. 9). The accumulator assembly 150 prevents the creation of a vacuum downstream of the hydraulic line check valve 172 when deploying the variable area fan nozzle 74.

FIG. 16A is an illustration of a schematic diagram illustrating an embodiment of an accumulator assembly 130 for use with embodiments of the actuation system 10 of the disclosure. The accumulator assembly 150 comprises an accumulator housing 152 having a vent opening 164 for allowing air 168 to enter the accumulator assembly 150. The accumulator assembly 150 further comprises a check valve 154 and a restrictor portion 156. The accumulator assembly 150 further comprises a floating piston 166 coupled to one or more seals 158 and one or more bearings 160. The accumulator assembly 150 may further comprise a compression spring 162. The accumulator assembly 150 is connected to the first hydraulic line 34, and the accumulator assembly 150 controls the flow of hydraulic fluid 170 out of and into the accumulator assembly 150 to and from the first hydraulic line 34. FIG. 16B is an illustration of a schematic diagram of the accumulator assembly 150 of FIG. 16A showing hydraulic fluid 170 flowing out of the accumulator assembly 150 when the variable area fan nozzle 74 is deploying. When the second inner piston 72 and the variable area fan nozzle 74 are deployed (see FIG. 6), the floating piston 166 moves down and the hydraulic fluid 170 is drawn out of the accumulator assembly 150. FIG. 16C is an illustration of a schematic diagram of the accumulator assembly 150 of FIG. 16A showing hydraulic fluid 170 flowing into the accumulator assembly 150 when the thrust reverser 32 is deploying. When the first outer piston 70 and the thrust reverser 32 are deployed (see FIG. 9), the floating piston 166 moves up, recharging the accumulator assembly 150, and the hydraulic fluid 170 is forced back into the accumulator assembly 150. The restrictor portion 156 prevents sudden movement of the floating piston 166.

In another embodiment of the disclosure, there is provided an actuation system 10 for an aircraft 12 having a jet engine 16. The actuation system 10 comprises a plurality of linear actuators 30. Each linear actuator 30 comprises an actuator housing 66. Each linear actuator 30 further comprises a first outer piston 70 concentric with a second inner piston 72. The first outer piston 70 is operatively connected to a thrust reverser 32. The second inner piston 70 is operatively connected to a variable area fan nozzle 74. The first outer piston 70 and the second inner piston 72 are substantially positioned within the actuator housing 66. The linear actuator 30 further comprises a synchronization assembly 51 positioned within the actuator housing 66 for synchronizing the first outer piston 70 and for actuating and synchronizing the second inner piston 72. The synchronization assembly 51 also synchronizes the first outer pistons 70 and the second inner pistons 72 of the other linear actuators 30. The synchronization assembly 51 comprises a flex shaft 52, a worm wheel gear 54, a worm shaft gear 56, and a lead screw 58. The actuation system 10 further comprises a piston lock assembly 90 for selectively locking the first outer piston 70 to the second inner piston 72 so that they may be actuated together or separately. The actuation system 10 further comprises at least one hydraulic line 34 coupled to the plurality of linear actuators 30. The actuation system 10 further comprises a control system 75 coupled to the plurality of linear actuators 30. The control system 75 is capable of actuating the second inner piston 72 independently of the first outer piston 70 and thus operating the variable area fan nozzle 74 between a variable area fan nozzle stowed position 67 and a variable area fan nozzle fully deployed position 106. The control system 75 is further capable of actuating the first outer piston 70 between a thrust reverser stowed position 68 and a thrust reverser fully deployed position 110 (see FIG. 12), while the piston lock assembly 90 is engaged.

Figure 19:
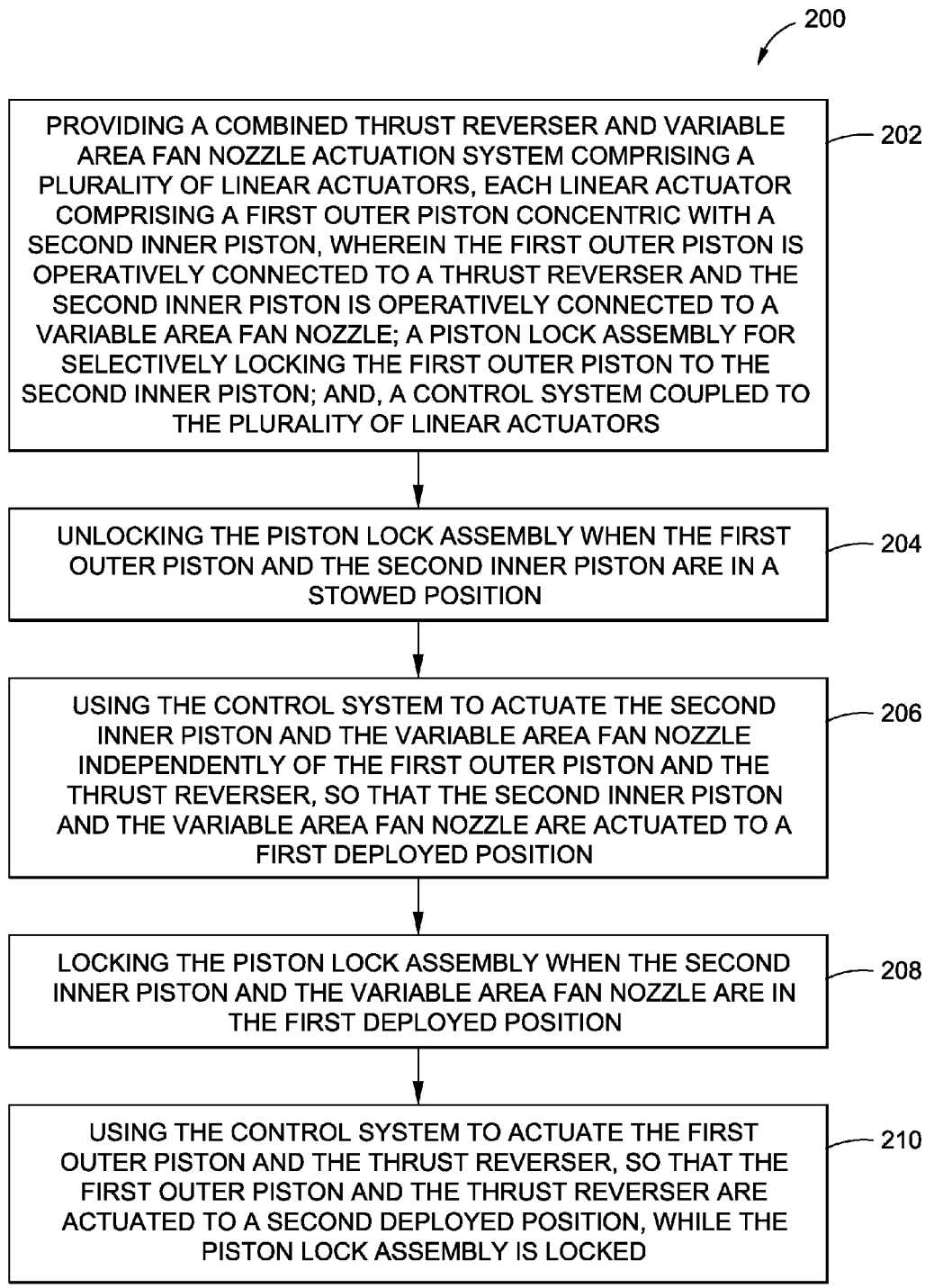

FIG. 19 is a flow diagram illustrating an exemplary method 200 of the disclosure. In another embodiment of the disclosure, there is provided a method 200 for actuating in a single actuation system 10 a thrust reverser 32 and a variable area fan nozzle 74 in an engine 16, preferably a jet engine, of an aircraft 12 (see FIG. 1A). The method 200 comprises step 202 of providing one of the embodiments of actuation system 10 with the combined thrust reverser 32 and the variable area fan nozzle 74 (see FIGS. 4, 11, 17), as discussed above. The actuation system 10 comprises a plurality of linear actuators 30 (see FIG. 3) where each linear actuator 30 comprises a first outer piston 70 (see FIG. 4) concentric with a second inner piston 72 (see FIG. 4). The first outer piston 70 is operatively connected to the thrust reverser 32 (see FIG. 4), and the second inner piston 72 is operatively connected to the variable area fan nozzle 74 (see FIG. 4). The actuation system 10 further comprises a piston lock assembly 90 (see FIGS. 4, 10A) for selectively locking the first outer piston 70 to the second inner piston 72 so that they may be actuated together or separately. The actuation system 10 further comprises a control system 75 (see FIGS. 4, 75) coupled to the plurality of linear actuators 30.

The method 200 further comprises step 204 of unlocking the piston lock assembly 90 when the first outer piston 70 and the second inner piston 72 are in a stowed position 109 (see FIG. 4). As shown in FIG. 4, the piston lock assembly 90 is in a locked position 102. As shown in FIG. 5, the extendable and retractable pin 94 is retracted to an unlocked position 104 so that the first outer piston 70 is not coupled to the second inner piston 72. FIG. 5 is an illustration of a schematic diagram illustrating a cut-away side view of the actuation system 10 of FIG. 4 showing the piston lock assembly 90 in an unlocked position 104.

Figure 6:
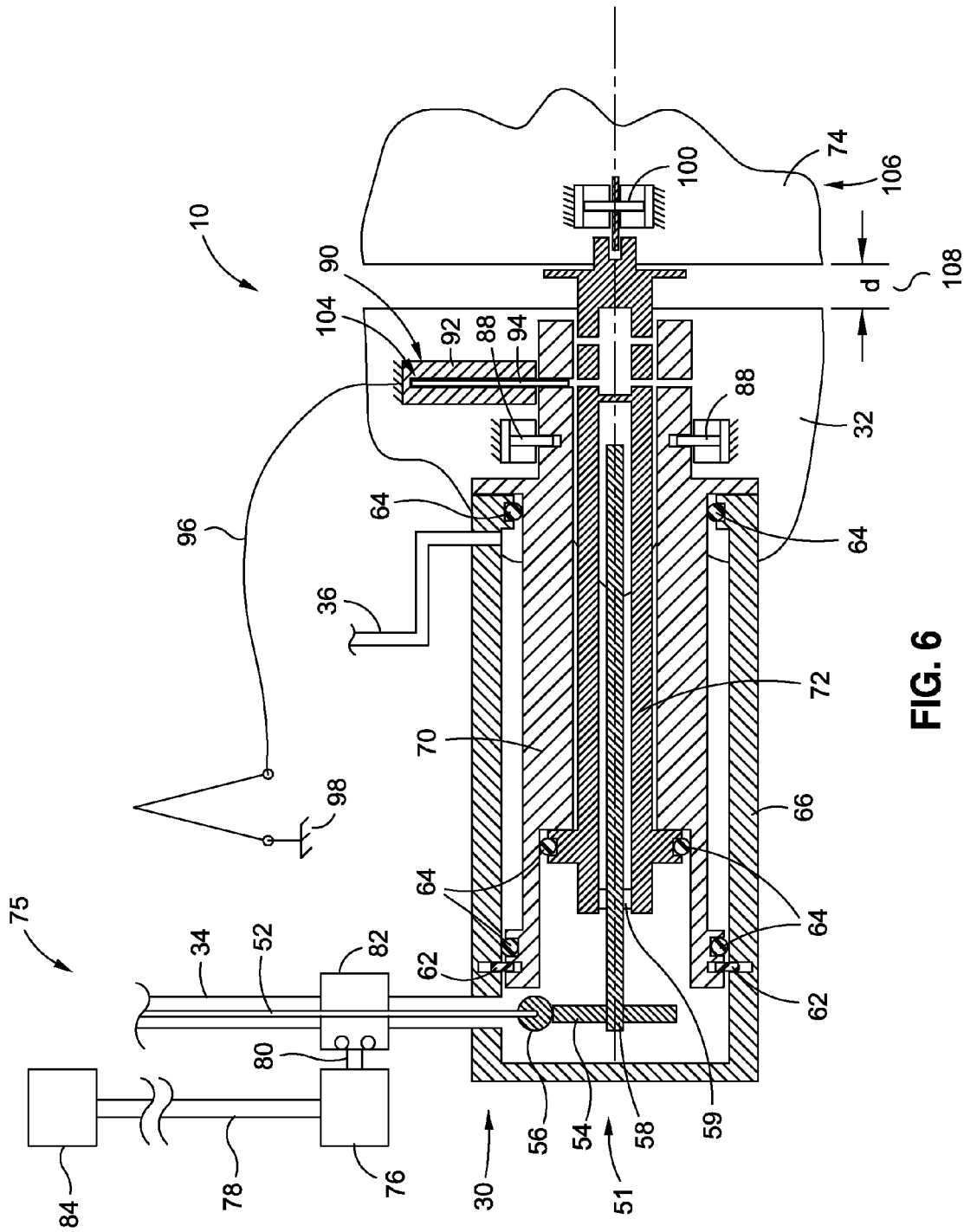
FIG. 6 is an illustration of a schematic diagram illustrating a cut-away side view of the actuation system of FIG. 4 showing a second inner piston and a variable area fan nozzle in a fully deployed position.

The method 200 further comprises step 206 of using the control system 75 to actuate the second inner piston 72 and the variable area fan nozzle 74 independently of the first outer piston 70 and the thrust reverser 32, so that the second inner piston 72 and the variable area fan nozzle 74 are actuated to a first fully deployed position 106 (see FIG. 6). FIG. 6 is an illustration of a schematic diagram illustrating a cut-away side view of the actuation system 10 of FIG. 4 showing the second inner piston 72 and the variable area fan nozzle 74 deployed, and showing the variable area fan nozzle 74 in a first fully deployed position 106, preferably the variable area fan nozzle fully deployed position 106. The motor element 76 of the control system 75 actuates the synchronization assembly 51 to actuate the second inner piston 72, and in turn, actuate the variable area fan nozzle 74. The variable area fan nozzle 74 is deployed a distance (d) 108 from the thrust reverser 32. The distance (d) 108 may be, for example, four (4) inches or another suitable distance. The piston lock assembly 90 is shown in an unlocked position 104.

Figure 7:
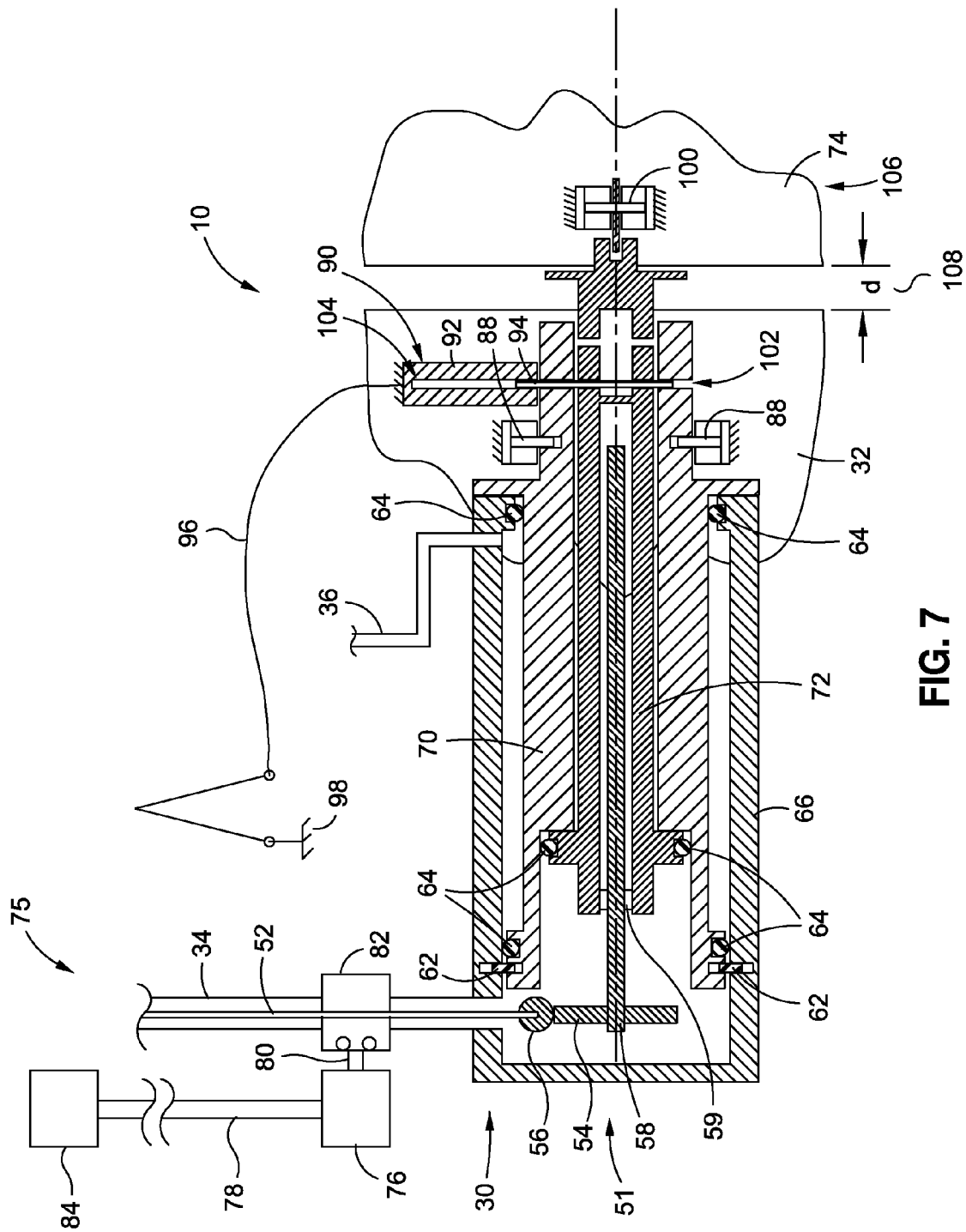
FIG. 7 is an illustration of a schematic diagram illustrating a cut-away side view of the actuation system of FIG. 4 showing a second inner piston and a variable area fan nozzle in a fully deployed position and a piston lock assembly in a locked position.

The method 200 further comprises step 208 of locking the piston lock assembly 90 when the second inner piston 72 and the variable area fan nozzle 74 are in the first fully deployed position 106. FIG. 7 is an illustration of a schematic diagram illustrating a cut-away side view of the actuation system 10 of FIG. 4 showing the second inner piston 72 and the variable area fan nozzle 74 deployed, and the variable area fan nozzle 74 in the variable area fan nozzle fully deployed position 106. As shown in FIG. 7, the extendable and retractable pin 94 is extended to a locked position 102 so that the first outer piston 70 is coupled to the second inner piston 72. The piston lock assembly 90 is in a locked position 102.

Figure 8:
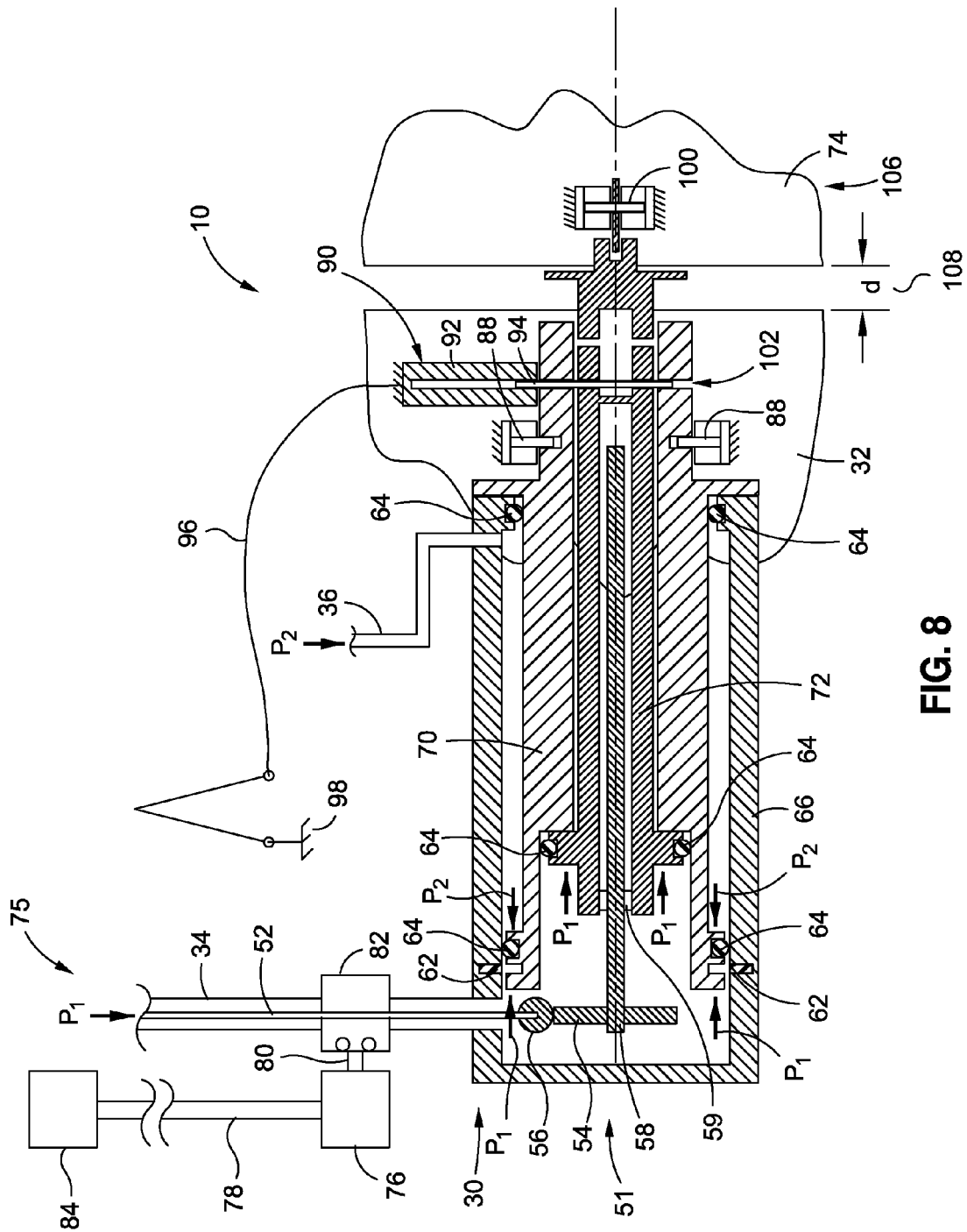
FIG. 8 is an illustration of a schematic diagram illustrating a cut-away side view of the actuation system of FIG. 4 showing hydraulic pressure being applied to actuate a first outer piston and a thrust reverser.
Figure 9:
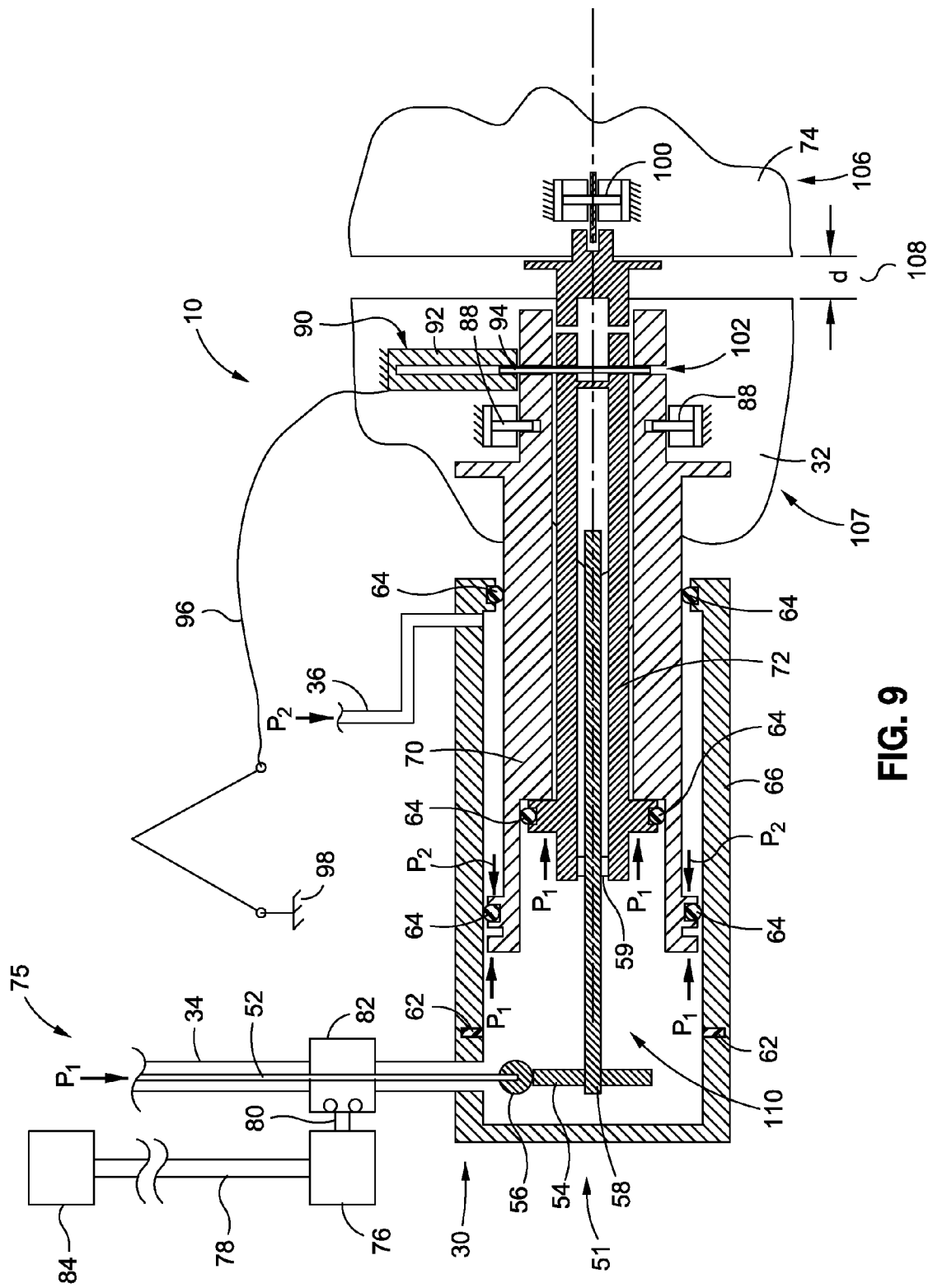
FIG. 9 is an illustration of a schematic diagram illustrating a cut-away side view of the actuation system of FIG. 4 showing a first outer piston and a thrust reverser in a mid-deployed position and a piston lock assembly in a locked position.

The method 200 further comprises step 210 of using the control system 75 to actuate the first outer piston 70 and the thrust reverser 32, so that the first outer piston 70 and the thrust reverser 32 are actuated to a second fully deployed position 110 (see FIG. 12), preferably the thrust reverser fully deployed position 110, while the piston lock assembly 90 is locked in a locked position 102 (see FIG. 12). FIG. 8 is an illustration of a schematic diagram illustrating a cut-away side view of the actuation system 10 of FIG. 4 showing hydraulic pressure $P_1$ being applied from the first hydraulic line 34 to actuate the second inner piston 72 and the variable area fan nozzle 74. FIG. 8 further shows hydraulic pressure $P_2$ being applied from the second hydraulic line 36 to actuate the first outer piston 70 and the thrust reverser 32. FIG. 9 is an illustration of a schematic diagram illustrating a cut-away side view of the actuation system 10 of FIG. 4 showing the first outer piston 70 and the thrust reverser 32 deployed. The thrust reverser 32 is in a thrust reverser mid-deployed position 107. The piston lock assembly 90 is in a locked position 102.

During an aircraft flight cycle, the sequencing of the variable area fan nozzle 74 and the thrust reverser 32 of one or more embodiments of the disclosed actuation system 10 and method 200 may comprise one or more of the following sequences: (1) the variable area fan nozzle 74 may be deployed prior to aircraft take-off, as shown in the sequence of FIGS. 4, 5, 6 and 7; (2) the variable area fan nozzle 74 may be stowed during aircraft climb, as shown in the sequence of FIGS. 7, 6, 5 and 4, or alternatively, if the hydraulic powered assembly 130 is used, as shown in the sequence of FIGS. 7, 14, 15 and 4; (3) the variable area fan nozzle 74 may remain stowed during aircraft cruise, as shown in FIG. 4; (4) the variable area fan nozzle 74 may be deployed during aircraft descent, as shown in the sequence of FIGS. 4, 5, 6 and 7; (5) the variable area fan nozzle 74 may remain deployed upon aircraft landing, as shown in FIG. 7, and the thrust reverser 32 may be deployed upon aircraft landing, as shown in the sequence of FIGS. 8 and 9, or alternatively, the variable area fan nozzle 74 may be stowed prior to deploying the thrust reverser 32, as may be required for engine fan stability; (6) the thrust reverser 32 may be stowed after the aircraft stops, as shown in the sequence of FIGS. 9 (except no $P_1$), 8 (except no $P_1$) and 7; and/or (7) the variable area fan nozzle 74 may be stowed if not already stowed as in step (5), as shown in the sequence of FIGS. 7, 6 (hydraulics turned off to unload the second inner piston), 5 and 4.

Embodiments of the actuation system 10 and method 200 provide a single actuation system that is common to both the thrust reverser 32 and the variable area fan nozzle 74, and the actuation system 10 and method 200 eliminate a need for a separate actuation system to actuate the variable area fan nozzle 74 while retaining the capability of the thrust reverser actuation. Embodiments of the actuation system 10 and method 200 can modify an existing thrust reverser hydraulic actuation system to include variable area fan nozzle actuation and to include such features as dual concentric pistons (first outer piston 72 and second inner piston 72), a mechanism to couple and de-couple the dual concentric pistons (piston lock assembly 90), and a control system 75 to independently power the synchronization assembly 51 and actuation of the dual concentric piston. The control system 75 may power the synchronization assembly 51 or the hydraulic power or both together. The actuation system 10 and method 200 enable the variable area fan nozzle 74 to move between the variable area fan nozzle stowed position 67 (see FIG. 4) and the variable area fan nozzle fully deployed position 106 (see FIG. 6) which results in an aerodynamic change to the variable area fan nozzle 74, and in turn, a reduction of environmental jet engine noise levels. Requirements regarding jet engine noise levels are set forth by the Federal Aviation Administration (FAA). Embodiments of the actuation system 10 and method 200 have two modes of operation, one to actuate the variable area fan nozzle 74 and one to actuate the thrust reverser 32. The variable area fan nozzle 74 mode uses a motor element 76, preferably either electric or hydraulic, to power the synchronization assembly 51. Having a single actuation system with a common actuator for the thrust reverser 32 and the variable area fan nozzle 74 can also provide the advantage of a reduction in the overall weight of the aircraft. Such reduction in overall weight of the aircraft can improve reliability and improve fuel efficiency of the aircraft. Because a separate actuation system is not required for the variable area fan nozzle, duplication of components such as actuators, synchronization assemblies, hydraulic tubing, and associated structural support for the components is eliminated. A reduction of such components can improve reliability and can provide an opportunity for weight savings, which in turn, improves fuel efficiency of the aircraft.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An actuation system for a gas turbine engine including a thrust reverser and a variable area fan nozzle, the system comprising:
   a plurality of linear actuators, each linear actuator comprising a first outer piston concentric with a second inner piston, wherein the first outer piston is operatively connected to a thrust reverser and the second inner piston is operatively connected to a variable area fan nozzle;
   a piston lock assembly for selectively locking the first outer piston to the second inner piston, the piston lock assembly comprising a solenoid coupled to an extendable and retractable pin, the extendable and retractable pin configured for insertion into two corresponding first outer piston slots formed in opposite sides and at a same axial location on the first outer piston, and configured for insertion into one of two corresponding second inner piston slots formed at different axial locations along the second inner piston, the second inner piston slots being configured to allow the variable area fan nozzle to be locked in a stowed position or a deployed position, respectively, and being further configured to allow the extendable and retractable pin to be moved into and out of the first outer piston slots and one of the two second inner piston slots with an axial movement of the first outer piston and the second inner piston; and,
   a control system coupled to the plurality of linear actuators for operating the variable area fan nozzle between the stowed position and the deployed position.

2. The system of claim 1, wherein the solenoid is coupled to a pair of extendable and retractable pins, and wherein the pins are designed for insertion into the corresponding slots formed in the first outer piston and the second inner piston.

3. The system of claim 1, wherein the control system comprises a power source, a supply line, a motor element, a drive shaft, a gear box, a first hydraulic line, a flex shaft, and a second hydraulic line.

4. The system of claim 1, wherein the control system is capable of actuating the second inner piston independently of the first outer piston.

5. The system of claim 1, wherein the control system is capable of actuating the first outer piston between a thrust reverser stowed position and a thrust reverser deployed position while the piston lock assembly is engaged.

6. The system of claim 1, wherein each linear actuator further comprises a synchronization assembly driven by the control system for synchronizing the first outer piston and for actuating and synchronizing the second inner piston, the synchronization assembly comprising a flex shaft, a worm shaft gear, a worm wheel gear, and a lead screw.

7. The system of claim 6, wherein when the first outer piston and the second inner piston are locked together, they are actuated together by common rotation of the synchronization assembly.

8. The system of claim 1, wherein each linear actuator further comprises a hydraulic assist assembly comprising a flow passage formed through the first outer piston, one or more stop elements formed along an actuator housing interior, and one or more seal elements inserted between the first outer piston and the second inner piston.

9. The system of claim 1, wherein a single actuation system is common to both the thrust reverser and the variable area fan nozzle.

10. The system of claim 1, wherein the system enables the variable area fan nozzle to move between the stowed position and the deployed position, which results in an aerodynamic change to the variable area fan nozzle, and in turn, a reduction of environmental engine noise levels.

11. The system of claim 1, wherein the system further comprises an accumulator assembly for storing and supplying hydraulic fluid to the second inner piston.

12. The system of claim 1, wherein when the control system is powered, the piston lock assembly is locked and only the second inner piston is actuated.

13. An actuation system for an aircraft having a jet engine including a thrust reverser and a variable area fan nozzle, the system comprising:
   a plurality of linear actuators, each linear actuator comprising:
   an actuator housing;
   a first outer piston concentric with a second inner piston, wherein the first outer piston is operatively connected to a thrust reverser and the second inner piston is operatively connected to a variable area fan nozzle, the first outer piston and the second inner piston being substantially positioned within the actuator housing;
   a synchronization assembly positioned within the actuator housing for synchronizing the first outer piston and for actuating and synchronizing the second inner piston, the synchronization assembly comprising a flex shaft, a worm wheel gear, a worm shaft gear, and a lead screw;
   a piston lock assembly for selectively locking the first outer piston to the second inner piston, the piston lock assembly comprising a solenoid coupled to an extendable and retractable pin, the extendable and retractable pin configured for insertion into two corresponding first outer piston slots formed in opposite sides and at a same axial location on the first outer piston, and configured for insertion into one of two corresponding second inner piston slots formed at different axial locations along the second inner piston, the second inner piston slots being configured to allow the variable area fan nozzle to be locked in a stowed position or a deployed position, respectively, and being further configured to allow the extendable and retractable pin to be moved into and out of the first outer piston slots and one of the two second inner piston slots with an axial movement of the first outer piston and the second inner piston;
   at least one hydraulic line coupled to the plurality of linear actuators; and,
   a control system coupled to the plurality of linear actuators, the control system capable of actuating the second inner piston independently of the first outer piston and thus operating the variable area fan nozzle between a the stowed position and a the deployed position, and the control system further capable of actuating the first outer piston between a thrust reverser stowed position and a thrust reverser deployed position, while the piston lock assembly is engaged.

14. The system of claim 13, wherein the solenoid is coupled to a pair of extendable and retractable pins, and wherein the pins are designed for insertion into the corresponding slots formed in the first outer piston and the second inner piston.

15. The system of claim 13, wherein a single actuation system is common to both the thrust reverser and the variable area fan nozzle.

16. The system of claim 13, wherein each linear actuator further comprises a hydraulic assist assembly comprising a flow passage formed through the first outer piston, one or more stop elements formed along an actuator housing interior, and one or more seal elements inserted between the first outer piston and the second inner piston.

17. The system of claim 13, wherein the system enables the variable area fan nozzle to move between the stowed position and the deployed position, which results in an aerodynamic change to the variable area fan nozzle, and in turn, a reduction of environmental jet engine noise levels.

18. A method for actuating in a single actuation system a thrust reverser and a variable area fan nozzle in an aircraft jet engine, the method comprising:
  providing a combined thrust reverser and variable area fan nozzle actuation system comprising:
  a plurality of linear actuators, each linear actuator comprising a first outer piston concentric with a second inner piston, wherein the first outer piston is operatively connected to a thrust reverser and the second inner piston is operatively connected to a variable area fan nozzle;
  a piston lock assembly for selectively locking the first outer piston to the second inner piston, the piston lock assembly comprising a solenoid coupled to an extendable and retractable pin, the extendable and retractable pin configured for insertion into two corresponding first outer piston slots formed in opposite sides and at a same axial location on the first outer piston, and configured for insertion into one of two corresponding second inner piston slots formed at different axial locations along the second inner piston, the second inner piston slots being configured to allow the variable area fan nozzle to be locked in a stowed position or a deployed position, respectively, and being further configured to allow the extendable and retractable pin to be moved into and out of the first outer piston slots and one of the two second inner piston slots with an axial movement of the first outer piston and the second inner piston; and
  a control system coupled to the plurality of linear actuators;
  unlocking the piston lock assembly when the first outer piston and the second inner piston are in the stowed position;
  using the control system to actuate the second inner piston and the variable area fan nozzle independently of the first outer piston and the thrust reverser, so that the second inner piston and the variable area fan nozzle are actuated to a first deployed position;
  locking the piston lock assembly when the second inner piston and the variable area fan nozzle are in the first deployed position; and,
  using the control system to actuate the first outer piston and the thrust reverser, so that the first outer piston and the thrust reverser are actuated to a second deployed position, while the piston lock assembly is locked.

19. The method of claim 18 further comprising providing a hydraulic assist assembly to the combined thrust reverser and variable area fan nozzle actuation system, wherein the hydraulic assist assembly assists with hydraulic force and facilitates actuation of the first outer piston and the thrust reverser.

20. The method of claim 18 further comprising providing an accumulator assembly for storing and supplying hydraulic fluid to the second inner piston.

21. The method of claim 18, wherein the method enables the variable area fan nozzle to move between the stowed position and the deployed position, which results in an aerodynamic change to the variable area fan nozzle, and in turn, a reduction of environmental jet engine noise levels.

* * * * *